United States Patent
Andre et al.

(10) Patent No.: US 7,336,700 B2
(45) Date of Patent: Feb. 26, 2008

(54) SYSTEM BUS TRANSCEIVER INTERFACE

(75) Inventors: Gregory S. Andre, Oviedo, FL (US);
Diane McElyea, Orlando, FL (US);
Steven W. McGee, Oviedo, FL (US)

(73) Assignee: Lockheed Martin Corporation, Bethesda, MD (US)

(*) Notice: Subject to any disclaimer, the term of this patent is extended or adjusted under 35 U.S.C. 154(b) by 536 days.

(21) Appl. No.: 09/955,966

(22) Filed: Sep. 20, 2001

(65) Prior Publication Data

US 2003/0161391 A1    Aug. 28, 2003

(51) Int. Cl.
*H04B 1/38* (2006.01)
*G06F 15/16* (2006.01)

(52) U.S. Cl. ........................... 375/219; 709/235

(58) Field of Classification Search ................ 375/219, 375/220; 709/235, 220, 250; 710/104; 713/160
See application file for complete search history.

(56) References Cited

U.S. PATENT DOCUMENTS

| | | | |
|---|---|---|---|
| 4,612,653 A * | 9/1986 | Livingston et al. | 375/239 |
| 5,193,163 A | 3/1993 | Sanders et al. | |
| 5,502,718 A | 3/1996 | Lane et al. | |
| 5,524,216 A | 6/1996 | Chan et al. | |
| 5,555,430 A * | 9/1996 | Gephardt et al. | 712/16 |
| 5,761,526 A | 6/1998 | Sakakura et al. | |
| 5,890,217 A | 3/1999 | Kabemoto et al. | |
| 5,990,939 A | 11/1999 | Sand et al. | |
| 6,041,400 A | 3/2000 | Ozcelik | |
| 6,138,176 A | 10/2000 | McDonald et al. | |
| 6,195,593 B1 | 2/2001 | Nguyen | |
| 6,327,625 B1 * | 12/2001 | Wang et al. | 709/235 |
| 6,609,167 B1 * | 8/2003 | Bastiani et al. | 710/104 |
| 6,704,310 B1 | 3/2004 | Zimmermann | |
| 6,718,413 B1 * | 4/2004 | Wilson et al. | 710/260 |
| 6,772,263 B1 | 8/2004 | Arramreddy | |
| 6,842,800 B2 | 1/2005 | Dupont | |
| 2003/0051077 A1 * | 3/2003 | Fengler | 710/8 |
| 2003/0135678 A1 | 7/2003 | Andre | |

FOREIGN PATENT DOCUMENTS

| | | | |
|---|---|---|---|
| JP | 08272756 A | 10/1996 | |
| JP | 09022380 A | 1/1997 | |
| JP | 09153009 A | 6/1997 | |

OTHER PUBLICATIONS

Shanley, Tom et al., "PCI System Architecture." Mind Share, Inc., 3rd Ed., 1995, pp. 39-43 and 77-88.

* cited by examiner

*Primary Examiner*—Sam K. Ahn
(74) *Attorney, Agent, or Firm*—Buchanan Ingersoll & Rooney PC

(57) ABSTRACT

The present invention is directed to a transceiver configured for use with a multi-tier system bus that allows for the flow of information to be managed among plural processors by connecting processors within modules on a local bus, which is then connected to the system bus by way of a gateway. The transmitter portion of the transceiver of the present invention allows for the high performance of the bus by providing buffering and interleaved output of direct memory access and control actions packet types. The receiver portion of the transceiver of the present invention provides input discrimination and individual buffering of direct memory access and interrupt control actions packets along with specialized control functions, such as reset, timer, broadcast, and so forth.

9 Claims, 4 Drawing Sheets

SYSTEM BUS TRANSCEIVER INTERFACE

FIELD OF THE INVENTION

The present invention relates generally to a transceiver used in transferring information, such as data and control actions, between processors and computer busses. More particularly, the present invention relates to a transceiver used in a high performance computer bus system for interconnecting plural processors.

BACKGROUND

Bus systems for interconnecting plural processors are known. For example, it is known to interconnect an array of processors to perform real time image processing, wherein a live video stream is processed in real time to identify specific features within the continuously changing image. A parallel processing array has been used for pipelining the data stream, wherein the processors are interconnected using any of a variety of bus systems, including, bus systems available on VME form factor cards. A fundamental operating principal of conventional bus systems, however, is to permit a very large number of processors to be connected with the bus.

However, conventional array bus systems, like those found in the VME world, tend to be more complex and difficult to implement in small specialized embedded systems. These complexities include interconnection schemes, compatibility issues, data routing, and control methods. Interconnection schemes such as crossbar interconnect require additional wiring needed to support multiple parallel paths. Compatibility and performance issues drive the need for more electronics such as those required to provide additional interfaces for the VME bus and other conventional interfaces found in VME subsystems. Data routing methods used are more prone to momentarily lock out path segments that may prevent some of the processors from receiving messages in the required time. Control methods utilize the VME bus for interfacing the array which adds overhead. While these types of systems may work well in larger applications they have too much overhead and are therefore not practical for specialized embedded array processor systems. Embedded Systems must maximize performance in a small space (i.e., MIPS per unit Volume) as well as to minimize power consumption. Real time response is also critical in embedded arrays and control functions must be tightly integrated into their design.

In addition, the use of a VME Form Factor is unsuitable where space constraints are a significant factor. For example, when image processing is to be performed on board a manned or unmanned vehicle, efficient use of space becomes a significant constraint. Accordingly, it would be desirable to provide a bus system which can be implemented in a space efficient manner, and which can operate efficiently to optimize data and control action throughput.

SUMMARY OF THE INVENTION

The present invention is directed to providing a transceiver used in a bus system, designed to achieve the objectives mentioned above, that can be implemented in a relatively small amount of space, and that can operate in a highly efficient, high performance manner. Exemplary embodiments are implemented using a SEM E form factor, which is a standard form factor for circuit boards that is substantially smaller than the VME form factor. To satisfy the size constraints of the SEM E form factor, exemplary embodiments implement a parallel array processing system wherein many of the software functions previously performed by the various processors of a processing array are performed within the hardware of the bus system architecture thereby freeing up the processors. Exemplary embodiments implement this additional hardware functionality within the bus system such that the bus can take on increased responsibility of the overall processor array, while improving the overall bus performance.

In accordance with an exemplary embodiment of the present invention, the functionality of the system bus architecture is facilitated by a specialized transceiver for connecting processors to the system bus that implements separate transmitter and receiver function. The transmitter functions provided by the transceiver include buffering and interleaving output of direct memory access and control actions packet types. The receiver function provided by the transceiver include providing input discrimination and individual buffering of direct memory access and interrupt control actions packets along with specialized control functions (e.g., reset, timer, broadcast, etc.). By way of the transceiver of the present invention, transmitter and receiver functionality may be provided in parallel. Significant advantages are realized in accordance with the present invention by providing hardware functionality that was previously performed as software functionality.

In addition, the transceiver is used in a multi-tier bus system with a multiple arbitrator scheme that optimizes bus efficiency. In accordance with exemplary embodiments, specific control actions implemented in the bus hardware have been developed, along with a protocol whereby clear (i.e., not busy) path segments are identified before any information is sent over the segment. Such a feature avoids attempts to transfer information over portions of the bus which are busy, or to processors which are unable to respond at that point in time to the information.

Generally speaking, exemplary embodiments of the present invention are directed to a transceiver for use within a multi-tier system bus configuration. The transceiver has both a means for receiving and a means for transmitting that act independently (i.e., in parallel) to receive and transmit instructions via the system bus, respectively. The transceiver also has means for buffering both instructions received and instructions transmitted via the system bus.

BRIEF DESCRIPTION OF THE DRAWINGS

Other objects and advantages of the present invention will become more apparent to those skilled in the art upon reading the detailed description of the preferred embodiments, wherein like elements have been designated by like numerals, and wherein.

DETAILED DESCRIPTION

Figure 1:
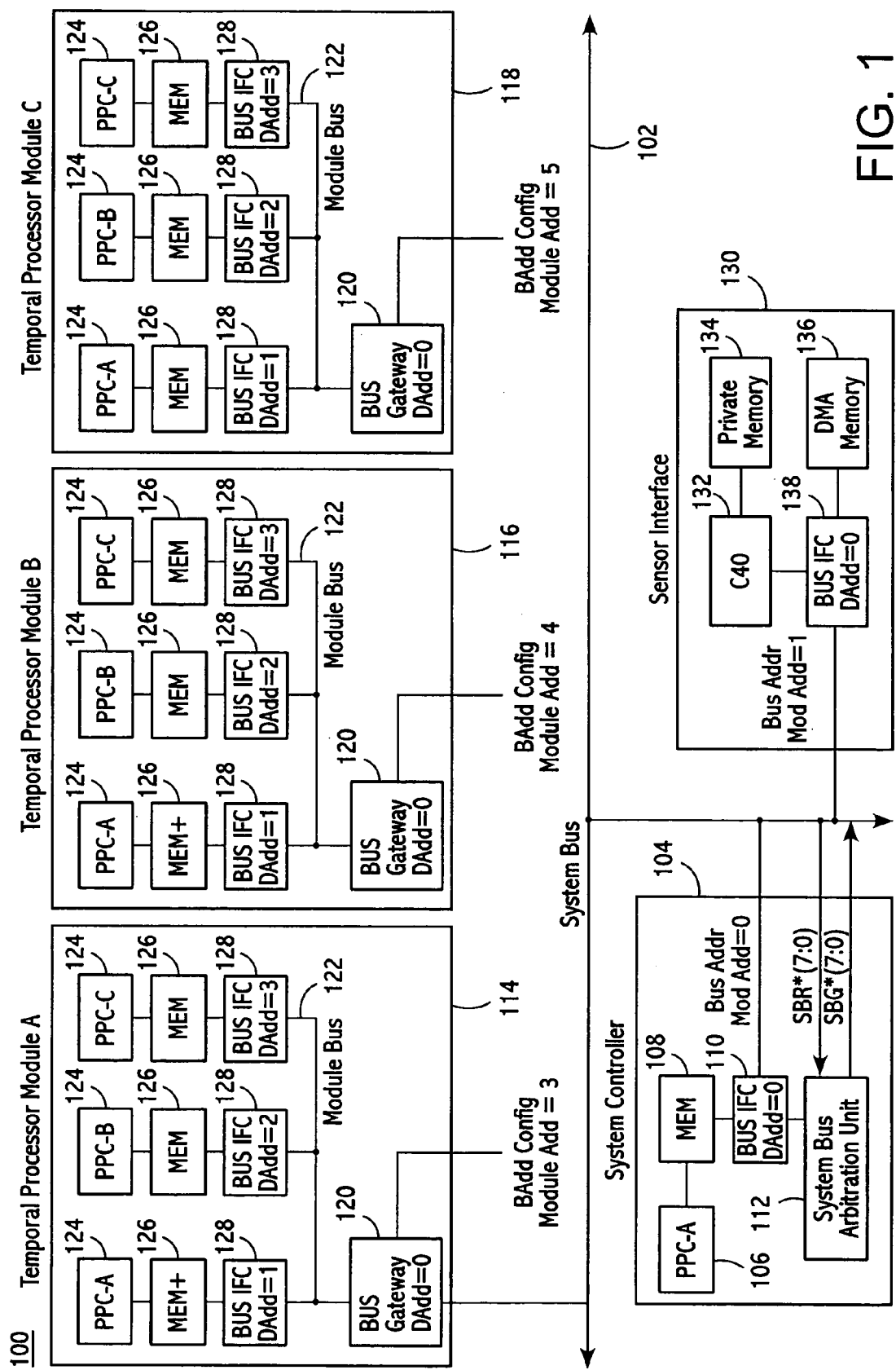
FIG. 1 is a block diagram of a general processor system bus architecture for connecting processor subsystems according to an exemplary embodiment of the present invention.

To facilitate an understanding of the principles and features of the present invention, it is explained hereinafter with reference to an exemplary embodiment. FIG. 1, illustrates an exemplary apparatus for managing the flow of information among plural processors of a processing array depicted as the processor system bus architecture 100 within which the transceiver of the present invention finds utility. This system bus architecture is the subject of copending patent application Ser. No. 09/955,961, filed on even date herewith, entitled "Two Level Multi-Tier System Bus," which is hereby incorporated herein by reference in its entirety. In the processor system bus architecture 100, a system bus 102 is used to interconnect multiple processors. Access to the system bus 102 is controlled by a means for arbitrating access, or the system controller (SC) 104. The system controller 104 contains a Power PC (PPC) processor 106 designated PPC-A and transfers system bus control actions over the system bus 102 using a transfer protocol, described hereinafter with greater detail. The power PC processor 106 is connected to memory 108 and a bus interface device 110, which is connected directly to the system bus 102. Also contained within the system controller 104 is a system bus arbitration unit 112, which is connected directly to the system bus 102 for controlling access to the system bus 102 by various devices connected thereto. This access is arbitrated independently of the processors connected by the system bus 102.

The system bus is connected to various temporal processor (TP) modules, designated temporal processor module A 114, temporal processor module B 116, and temporal processor module C 118. The system bus is connected to each temporal processor via individual bus gateway components 120 contained within each of the temporal processor modules. More temporal processor modules may be used in accordance with the present invention and connected to the system bus 102. However, for the sake of convenience, only three are shown. Similar components are contained within each of the temporal processor modules 114, 116, and 118 and these modules will be treated as identical for the sake of simplicity. However, the components contained within each of the temporal processor modules 114, 116, 118, and any additional temporal processor modules connected to the system bus 102 may be varied, and need not be identical.

The temporal processor modules 114, 116, and 118 each contain a local bus 122, or module bus, which connects various components on individual branches of the module bus through the bus gateway device 120 to the system bus 102. These components contained on each branch of the module bus are referred to as a node. Each node contains a processor 124, memory device 126 and a bus interface device 128. The bus interface device 128, or temporal processor bus interface (TPBI), may be fabricated, according to one embodiment of the present invention, in a laser programmable gate array (LPGA). This interface device 128 will be described in greater detail hereinafter with reference to FIG. 2. Each node, on each branch of the module bus 122, can be considered identical for the sake of convenience. However, it should be recognized that various combinations of components could be used within each node. For example, each node of each temporal processor module is shown as using a Power PC-type processor. However, any other type of processor could be used in its place. For example, a geometric arithmetic parallel processor (GAPP), available from Teranex, Inc. of Florida, could be used instead of a Power PC processor, or any suitable processor could be used.

In addition to the system controller 104 and the temporal processor modules 114, 116, and 118, a sensor interface (SI) 130 can also be connected to the system bus 102. This sensor interface 130 is an interface between the system processors 106, 124, and the outside world. The sensor can, for example, be a video sensing device, or a more sophisticated imaging device such as a forward looking infrared display device (FLIR), for example. It should also be recognized that a different type of sensor interface, other than a video or infrared device, can be attached to the system bus 102, and benefit from the processor system bus architecture 100 of the present invention. A digital signal processor 132, in this case a C40 processor from Texas Instruments, is used to process digital signals received by the sensor interface 130. It should be recognized, however, that the processor 132 need not be limited to a particular type, such as the C40 processor. Rather, the processor 132 of the sensor interface 130 can comprise any one or more of a variety of different types of processors suitable to perform digital signal processing, according to the task to be performed by the sensor interface, such as a Power PC processor. Also contained within the sensor interface 130 is a private memory device 134, and a direct memory access memory device 136. The elements contained within the sensor interface 130 are connected to the system bus by way of a bus interface device 138, similar to the bus interface devices 128, 110 within each of the temporal processor modules 114, 116, 118, and the system controller 104.

In one embodiment of the present invention, the sensor interface 130 of the processor system bus architecture 100 can be connected via DMA memory device 136, to external spatial processors (SP). These spatial processors (which are not shown in FIG. 1) can include, for example, the GAPP processor, or other similar spatial processors, for filtering and rendering video signals. Such spatial processors are advantageous because they identify the subject of interest within the non-essential spaces within each frame of video, and output only information about the subject of interest in the video signal. The temporal processor modules 114, 116, and 118, configured to temporally analyze digital signals to recognize elements that are changing temporally, or, in the case of video signals, moving from one frame to the next. This type of temporal analysis allows one to recognize movement in subjects, such as vehicles or projectiles, for example, and is accomplished by way of temporal processing modules 114, 116, and 118.

The processor system bus architecture 100 shown in FIG. 1 is advantageous in that it uses the system bus arbitration unit 112 to control communication on the system bus 102 in a manner such that packet oriented communications between arrays of processors can be directed to the processing modules in which they can be handled in the most expedited and efficient manner. This bus architecture 100 can be expanded, including more temporal processor modules, for example, or allowing for the sensor interface to be additionally connected to external devices, such as additional memory, or a spatial filter, for example. Additionally, a bulk memory module can be connected to the system bus 102 to allow for increased memory storage capacity.

The bus architecture system 100 shown in FIG. 1 is a multi-tier bus system in that it comprises a main, system bus 102, and local, module buses 122 contained within temporal processor modules 114, 116, 118, connected by way of interface devices 128 to individual processors 124. The system bus 102 is the primary control and data path of the processor subsystem, and carries signals regarding the major functions of the subsystem. This system utilizes a transmit only philosophy to handle transfers across multiple bus segments and to optimize transfer rates. In one exemplary embodiment of the present invention, packets of 64 bits are used in a packet transmit only communications scheme. In such an embodiment, each system and module bus is capable of a sustained transfer of 128 Megabytes per second (Mb/s) from a single requesting master, and 106 Mb/s from multiple interleaved requesting masters. It will be recognized by those skilled in the art, however, that the number of bits per packet and the transfer rate of the bus architecture system 100 used by the present invention will change as processor speeds increase, and limits in semiconductor technology are overcome.

In a 64 bit packet oriented bus architecture system, packets to be transmitted over the system bus are formatted with a header word and one or four data words. All bus operations are based on a transmit philosophy, whereby a packet is launched from a starting point, passed through a local bus according to arbitration rules, and connected to other buses via gateways until it reaches the destination encoded in its address. The path, or channel, that the packet follows is not held open once the packet is transmitted to the next segment of the bus, such that it can be used for the next packet transmission. That is, the system bus is maintained open for a packet transmission until the packet is transmitted to the bus gateway device 120, whereupon the system bus is no longer held open, and may be used to transmit other packets. The packet received by the bus gateway device is then transmitted over the module bus 122 according to its availability. An exemplary header word format for a system bus using a 64 bit packet communications scheme is shown in Table 1.

TABLE 1

| Bits(s) | Name | Function | Value |
|---|---|---|---|
| 63:52 | TSIZE | Transaction Size | 1 to 4096 Packets |
| 51:47 | ACODE | Action Code | (See Action Code Tables 3, 5, 25) |
| 46 | <spare> | Undefined | "0" |
| 45:44 | TTYPE | Transaction Type | (See Transaction Type Table 2) |
| 43:38 | DDA | Destination Device Address | 43:41 = Module (ECA) Address 40:38 = Device Address |
| 37:32 | SDA | Source Device Address | 37:35 = Module (ECA) Address 34:32 = Device Address |
| 31:0 | DMAD | Dest Memory Address | 31:0 = Add for Simple Write DMA |
| | DIVEC | Dest Interrupt Vector | 7:0 = Vector for Interrupt CA |
| | RRAD | Dest Local Read Address | 31:0 = Read Request CA |
| | BCMSK | Dest Broadcast Mask | 3:0 = Broadcast Mask |

Each bus gateway device 120 within the temporal processor module is capable of buffering four packets in each direction, and acts as a bus repeater within the 64 bit packet communications scheme. The gateway device 120 recognizes packet addresses that need to cross the gateway 120 in either direction to the local module bus 122 or to the system bus 102, and receives those packets into its input buffers. These buffers are provided to ensure that as packets are received by the gateway device, they may be stored until the gateway device has determined if they are addressed to a location within the module arbitrated by that gateway device. When the gateway device 120 has a packet in either of its buffers, the gateway device shall arbitrate for, and clear a channel to, the appropriate destination. This process of buffering packets through the gateway 120 allows the sending bus to be released for other functions prior to the packet reaching its final destination, which allows for greater freedom from network communication system traffic on the system bus, for example.

The addressing scheme for modules and devices on the system bus in a 64 bit packet communications scheme includes a 6 bit address field. Three bits are reserved for selecting modules or devices on the system bus, and three separate bits reserved for selecting devices on the module bus. Hence, on the system bus 102, or the module bus 122, there is a total of 8 addresses possible. The address 0 on the system bus 102 is reserved for the system controller 104, as indicated in FIG. 1. The address 0 on the module bus 122 is reserved for the bus gateway device 120, as indicated in FIG. 1. Addresses 1-6 are reserved for modules or devices and/or modes, such as the temporal processor modules 114, 116, and 118, and the sensor interface 130.

As is apparent from the addressing system, the processor system bus architecture 100 shown in FIG. 1 can be expanded to include more modules or devices to occupy the address locations 2 and 6 on the system bus. Also, the module bus 122 can use addresses 1-6 for nodes contained within the temporal processor modules 114, 116, and 118. Therefore, the number of nodes illustrated in the exemplary FIG. 1 embodiment within each of the temporal processor modules can be expanded to a total of 6 per module (addresses 1-6). Address 7 is used to indicate a broadcast address that will transmit to all receivers simultaneously and will require the bus to be cleared of activity. The various device addresses are indicated in FIG. 1, wherein "BAdd Config. Module Add" and "Bus Addr. Mod. Add" correspond to system bus addresses of various devices, and "DAdd" corresponds to local, or module bus addresses.

System Bus Arbitration

Arbitration within the processor system bus architecture 100 shown uses a modified rotating priority scheme where the module or device address 0 has a fixed priority, which is the highest. Devices having the address 1-6 rotate in priority each time they access the bus. The manner by which addresses 1-6 rotate in priority may include, for example, a round robin rotation. The manner in which addresses 1-6 rotate in priority can vary, however, as will be recognized by those skilled in the art, but this rotation shall maintain nearly random sequencing to allow for system bus traffic to be minimized. Address 7 is a broadcast address that transmits to all receivers simultaneously and requires the bus to be cleared of activity by halting access to the system bus 102 until all receivers are clear to allow for all receivers, or gateways 120, to receive a broadcast message simultaneously. In many conventional bus architecture systems, by contrast, it is necessary to incorporate wait states or transition aborts in cases where the system bus is too busy to transmit a message, or a receiving destination is incapable of receiving a transmission. However, the present invention eliminates the need for such wait states or transition aborts as the bus arbitration logic ensures that each destination is capable of receiving a packet before access to the system bus 102 is granted.

The lack of need for wait states is accomplished through the use of bus destination address lines (BDAL) from each bus requestor that indicate the local address of the intended destination module or device. This address may include addresses 0-6 for specific modules or devices, or 7 for a broadcast message. On the system bus 102, the local destination is the module address. On the module bus 122, the local destination is the device address of each node intended to be accessed or addressed. Additionally, a receiver busy bit (RBB) is provided by each destination interface used by the arbitration logic and indicates when a device is busy. This RBB is used in connection with the BDAL to determine that a path is clear and a bus grant (BG), or access to the system bus 102, can be given.

In the case that the module address is intended to be transmitted outside of the module, through the bus gateway 120 and over the system bus 102, the bus interface device checks to see if the packet to be transmitted is addressed to a module other than the local one. If such an external address exists, the bus interface device uses an address 0 on the BDAL to indicate that the packet is to be routed externally from the module through the gateway device. The correct destination device address is included in the packet header because the BDAL only includes the destination device address, and the arbitration unit or bus gateway device 120 would not otherwise be able to determine if the packet is to be transmitted on or off board.

The rotating priority mechanism can be implemented such that each time a bus grant (BG) is given, the priority of devices 1-6 rotates. This round robin-style rotation can occur such that the relationship of the relative priority pointer to the bus request lines increments. In this manner, a priority value, such as 1, which may be assigned to a bus request signed by the device with address 3, for example, may be caused to move to a device making a bus request with address 4, and all other bus requests would be moved accordingly.

One important aspect of the present invention is that the priority scheme of the arbitration logic causes a currently granted master to yield control of the bus upon completion of its transfer to any other requesting master despite priority. Therefore, when multiple bus requests are present, the bus is yielded to another master between each packet preventing the bus from being dominated by a single master carrying out a large transfer of multiple packets. During times that no other master is requesting a bus, the arbitration logic administered by the system bus arbitration unit 112 will continue to grant access to the current master, thereby allowing it to transfer successive packets without clock delay often experienced in systems incorporating switching bus masters. When several masters request bus access, the one with higher priority shares with the others, alternating every other clock cycle with the masters having lower priorities, who gain access between access times by the master with the higher priority on a rotating priority basis.

The system controller 104 is given a priority address 0 on the system bus 102. The bus gateway 120 are granted a priority address 0 on each module bus 122 within each temporal processor module 114, 116, 118. Because of this ultimate priority, the system controller 104 and the bus gateway 120 are guaranteed to access the system bus 102, and module bus 122, respectively, during the packet cycle immediately following the cycle during which they requested it. This is crucial for the system controller 104, as it is the primary controller in the system that coordinates the initialization and operation of all modules 114, 116, 118, 130 in the system. The bus gateway device 120 also requires this high priority on the module bus 122, as it retransmits packets between the system bus 102 and its local module bus 122 and control arbitration on the module bus 122.

The processor system bus architecture 100 can also implement an arbitration time out scheme that checks for an assertion of a time out indication. This time out indication (ABBb) can be given within an unspecified number of clock cycles from the issuance of a bus grant to a given master. If the time out period expires, the arbitration unit will remove the grant and wait a minimum of one clock cycle before asserting the next grant. During this minimum wait time of one clock cycle, the arbitration logic can check to see if the previously granted master asserted the ABBb indication before asserting the grant to the next prioritized requesting master. Such arbitration logic for the system bus 102 is located in the system controller 104, while for the module bus it is located within the bus gateway 120.

Transaction Types

There are essentially three basic types of bus operations supported by the present invention. These basic transaction operations are outlined below in Table 2. All transfers outlined below in Table 2 are made up of transmitted packets which contain a header word followed by 1-4 64 bit data words. These transaction types, which are described in greater detail below, include: a simple write (SW), a requested write (QW) and a control action (CA).

TABLE 2

| Transaction Type | Code | Value | Description |
| --- | --- | --- | --- |
| Simple Write | SW | 00 | Send write Packet(s) 1 or 4 words |
| Request Write | QW | 01 | Requested write packet(s) |
| Control Action | CA | 11 | Interrupts/Test and set or clear |

The packets transmitted according to the transaction type indicated above in Table 2 are sent using a similar technique as mail, and may route through as many as two bus gateways in order to transfer from one module bus to another. Each bus interface or gateway is able to buffer at least four packets in each direction, and must be capable of supporting a retransmit function. Each bus interface or gateway also has a time out signal that returns an error packet after attempting four retries. Those skilled in the art, however, will recognize that the number of data words contained within each data packet, the number of packets required to be sent by each bus interface or gateway, and the number of retries attempted before returning an error signal may be modified according to the desired result without departing from the spirit of the invention.

Action Codes

Action codes are provided in the packet header word, which are used by the bus interface controller to signal its control device (i.e., the processor). The action codes vary for each type of transaction and are separately described in the sections which describe those transactions.

Simple Write

Simple write operations, such as the simple write operation outlined in Table 2, are source initiated transfers of a number of packets, denoted TSIZE and of four 64 bit words. A destination address is taken from the header memory address bits (31:0) (DMAD), outlined in Table 1, and indicates the storage location in the destination device memory map carried via the source host bus interface carries out the transfer of TSIZE packets by sending successive packets until all TSIZE packets have been sent. The DMAD is then incremented by four after each packet has been sent. The action codes listed in Table 3 below are applicable to the simple write operation, and serve to inform the receiving device of the start and end of packets of the overall transfer, which may be a series of 1 to 4096 packets in one embodiment of the present invention. For single packet transfers, both the start of write transfer bit (SOWT) and the end of write transfer bit (EOWT) should be set.

TABLE 3

| Action Code | Code | Value | Description |
|---|---|---|---|
| Start of Write Transfer | SOWT | xxxx1 | Informs destination device that this is the first packet of the overall transfer. |
| End of Write Transfer | EOWT | xxx1x | Informs destination device that this is last packet of the overall transfer. |
| | | xx0xx | Not Used - Set to Zero |
| Broadcast Mask | BCT | nnxxx | Broadcast Mask - Substitute for (nn) A = 00 B = 01 C = 10 D = 11 |

Requested Write

Requested write operations, such as the one outlined in Table 2, are initiated by the destination device by way of a read request (RQ) control action. These operations are performed advantageously in an optional hardware diagnostic mode. The requested device responds by sending a series of one or more packets until all of the data located in memory from the requested address location through the number of four word data packets specified by the transfer side (TSIZE) have been sent. The destination memory address is incremented by four each time a new packet is sent so that the packets always have the correct address for the data words being sent. The action codes listed in Table 4 below are the action codes associated with the requested write operations.

TABLE 4

| Action Code | Code | Value | Description |
|---|---|---|---|
| Start of Requested Transfer | SORT | xxxx1 | Informs Read Requesting Device that this is the first requested packet |
| End of Requested Transfer | EORT | xxx1x | Informs Read Requesting Device that this is the last requested packet |

Control Actions

Control Action Transaction Types Support Specialized Operations That Are Needed for Administration and Support of the Bus System and Inter-Processor Coordination and Synchronization.

Control action packets are always made up of a header and a single data word. The action code of the control action defines the type of control action to be taken. Table 5 below outlines the various control actions available.

TABLE 5

| Action Code | Code | Value | Description |
|---|---|---|---|
| Generate Interrupt | GINT | nn000 | Generate Control Action Interrupt. Vector = Bits 7:0 of header |
| Single Word Write (Not Implemented) | SWW | nn001 | Write a single word packet to the destination given in the header. |
| <spare> | | 00010 | Reserved for future use |
| Requested Read (Optional for Download Verify Only) | RRD | 00011 | Requests Destination Device to perform a DMA transfer of a specified range of its local memory back to the originating device |
| Clear Reference Counter | CLREF | nn100 | Signals Bus Interface to Pulse a clear to the Reference Counter associated with the destination device. Can only be commanded by System Controller (Modadd = 0) Upon HW Reset Ref Counter is cleared to zero. |

TABLE 5-continued

| Action Code | Code | Value | Description |
|---|---|---|---|
| Drive and Hold Processor Reset | CPUDR | nn101 | Signals Bus Interface to Drive and Hold Processor Reset such as would be needed for code download. Can only be commanded by System Controller (Modadd = 0) |
| Release Processor Reset | CPURR | nn110 | Signals Bus Interface to Release Processor from reset such as would be needed to start execution of download code. Can only be commanded by System Controller (Modadd = 0) |
| Set Broadcast Mask | SMB | nn111 | Data Word Bits 3:0 indicate which broadcast masts are to be selected. A = bit 0, b = bit 1, c = bit 2, D-bit 3 set none, any, or all three bits. Has no effect on Gateway since it simply passes a valid broadcast address. Initially all are disabled. |

In Table 5 above, the action codes and their abbreviated code format are abbreviated with their associated bit values. The bits "nn" pertain to a broadcast mask where A=00, B=01, C=10, and so on, and represent wildcard values when the modular device address to be accessed is 7.

Control Action Data Word

The control action data word is unique for each type of action code. The data words for each control action listed in Table 5 above, are described below.

Action nn000: Generate Interrupt (TINT)

The generate interrupt action causes an interrupt to be transmitted to the host processor for the receiving bussed interface vice. The data word for the interrupt packet is not used and should be discarded. In one embodiment of the present invention, the 15 bit word is stored in the interrupt buffer which includes the source interrupt address (13:8), the interrupt factor (7,0), and the valid flag (14). This information can subsequently be read by the processor.

Action 00001: Single Word Write (SWW)

The single word write action instructs the destination device to store the selected data word at a specified address. In one embodiment of the present invention, this mode is optional and is not implemented.

Action 000011: Requested Read (Optional—For Download Verification Only)

The requested read action causes the receiving bus interface to respond by transmitting data from a range of its local memory to a destination device making the read request. The destination address to which the data is to be stored in the local memory of the requesting device is specified in the DMAD portion of the header along with the number of packets in TSIZE. The source device local address for the data is stored in the control action data word.

This requested read action is optional, and is for download verification only. The requested read action cannot be managed by hardware protocol only, as such management could jam the receiver of a requested host some time if more than one read request has occurred and a previous request is delayed in the receiver. Therefore, according to one embodiment of the present invention, this feature should not be used by the operating software other than for purposes of verifying downloaded codes during initialization. In a further embodiment, this feature may not be implemented at all so as to implement any potential delays within the receiver and prevent any need for software arbitration.

Action 00100: Reset Reference Counter

The reset reference counter action allows an external device, such as the system controller shown in FIG. 1 to synchronize all devices, modules, or processors within the system to a common timing reference. This is accomplished by providing counters on each device and a common clock that can be started or stopped at will. The reset reference counter control action allows an external device to clear the timing counter of all the devices in order to synchronize them to a common reference clock that must be stopped during this process until all device counters have been cleared.

Action 00101 and 00110: Reset Controls

The resent control actions are provided to allow the system controller, such as system controller 104 shown in FIG. 1, to be able to reset any of the processors in the system. For these control actions to be employed properly, it is necessary that the source device address has an MAD=0 to restrict this function to receiving commands only from the system controller.

Action 00111: Set Broadcast Amounts

The set broadcast mask action informs the bus interface or bus gateway at the destination address to enable selected reception of a broadcast using specified masks, such as A, B, C, and/or D. During a broadcast transmission, all devices on the given bus segment which have been addressed with the module or device address 7 will be selected to receive a broadcast message. However, this broadcast message will only be received if the mask is enabled. The arbitration module, of course, has no way of knowing what mask is in place, and will wait for all devices on a particular bus segment to become available before sending the packet.

Bus Transfer Considerations

The two-level bus of the present invention uses a "transmit" methodology. This means that write operations flow in one direction only, and do not require a round trip, making write operations very efficient as they do not wait for any device to respond. A transmitted packet is routed and sent through the bus system without any delay or additional wait states. Conventional bus-read methodologies, however, do not work in this manner because it would require that the bus open a channel from source to destination, which would need to be held open until the operation is complete and all the data had been transferred across the bus. In prior systems, this would cause a significant loss in bus throughput as one or more systems/local buses could potentially be locked in idle during a large part of the read cycle. This transmit methodology provides an efficient communications scheme in a multiprocessor array as the time that any packet takes to cross the bus is minimized, and there are no wait states and no abort or retry operations necessary, as with prior approaches.

Two basic bus commands listed in Table 2 have been created to support control and data transfer operations across the system and module buses. These operations include: control actions (CA) and simple write operation (SW). Control actions include support for interrupts which can be used to signal or alert another processor of a desired event, condition, or request for it to act.

As stated previously, basic write and read functions are provided for by the present invention over the system bus. The write function associated with the present invention is simple and efficient, comprising of a series of packets being sent to their destination in a manner similar to that of email, or may accessed dynamically in a manner such as a direct memory access (DMA) to their destination. Read requests are handled by sending a request to the device wherein the desired data is stored instructing it to transmit the data back to the requester is a block of one or more DMA packets. This system is analogous to a traditional mail-order catalogue system, wherein various packages are desired and requested by a user over the telephone, for example, and the desired packages are then subsequently sent to the user.

DMA transfers can be initiated through the control action methodology, wherein the control action (CA) interrupt may request a DMA transfer. In such a situation, the local processor receiving the CA interrupt will, upon detection of the interrupt, access the associated DMA request in its memory. The processor then checks to see if its transmitter is available, and when the transmitter is available, it executes a request to carry out the DMA transfer requested by the CA interrupt. DMA transfers may be conducted by the bus interface controller, such as the ones illustrated in FIG. 1, for example, after being initiated by the host processor. This technique improves both bus and processor efficiency as the processor is not tied up with moving the data, and the bus is not tied up with waiting for the processor. Therefore, the bus may transfer data under a DMA action, while the processor may be concurrently performing other operations, without waiting for data transfers to be completed.

Processor synchronization is accomplished by the local, originating host sending a CA interrupt at the end of the DMA transfer. The local host knows that the DMA is complete when it receives a transmission complete interrupt at its local bus. Once a local host has received a transmission complete interrupt on its local bus, it is then free to begin another DMA transmission. The CA interrupt indicates to the receiving host that the DMA is complete, and which master has transmitted it. To this effect, an 8 bit interrupt vector indicates the type of transfer that has occurred but does not indicate specific addresses where the DMA has stored data. Rather, the receiving host software is preprogrammed to know where the data for a particular type of transfer has been stored.

Processor View of Bus Address

Each processor views the bus interface as in input/output (I/O) device within its own 32 bit address space. The bus interface has a set of control registers and a DMA device, and allows the controlled processor to set up and initiate a transfer via the DMA. The system bus address is mapped out to an extended format comprising a 6-bit device address and a 32 bit device local memory address. The 6-bit device address is encoded with two fields that are three bits wide that describe the destination module (ECE), and one of seven devices within that module. Addresses range from one to seven for each of these fields, and correspond to module and device addresses. The address 0, as mentioned above, is reserved for the primary bus master or gateway to a particular module and any resources provided by it. This 32 bit destination address will be advantageously aligned for 64 bit words, in accordance with one embodiment of the present invention.

Transaction

In one embodiment of the present invention, all transactions of the system bus utilize a common transfer methodology that involves a transmit operation sending one to four words in a packet format. This packet also contains a header, such as the one shown in Table 1, that describes the type of transfer and related control functions associated with it. Thus, the common transfer methodology involves a single hardware transfer type, i.e., the transmitted packet (with two variations, i.e., one or four words per packet may be transmitted at a single time). Using such a methodology simplifies the hardware design by having two variations of a single basic timing format.

Broadcast

As stated above, the system bus, such as the system bus 102 shown in FIG. 1, supports broadcast messages which originate from a single transmitter but are received by multiple devices or modules. To provide this functionality, the module or device address 7 is reserved as the broadcast address. This address signifies to a local server that all receivers are to receive the particular data addressed with the broadcast address 7. To guarantee that all devices receive the interrupt, the arbitration unit must wait until all busy lines, specified by a system receiver busy bit (SRBB 6:0) and/or a module receiver busy bit (MRBB 6:0), indicate that their respective receivers are available to receive transmissions. Bus gateway devices do not respond to address 7 on the system bus, but respond only to their own valid module address. On the module bus, such as module bus 122 shown in FIG. 1, the gateway device will repeat address 7 or any other address that is not its own module address to the system bus, thereby supporting such a broadcast transmission. When the broadcast transmission has been sent, the receivers will selectably acquire packets based upon the broadcast mask valuing A, B, C, or D associated therewith. Using this broadcast message address 7 methodology, several options for employing broadcast operations exist.

The following are examples of broadcast operations that consider a system controller (SC), multiple temporal processor modules (TP), and other modules having a single device and no gateway. The first example is when an SC, TP, or other module sends a packet addressing module device 7. In this first case, the packet will be routed to all modules on the system bus with a single device, and will not be sent to TPs. The second example is when an SC, TP, or other module sends a packet addressing another TP module address with device 7. In this second case, the packet will be routed to all devices on that TP module. The third example is when the device on a local TP module bus addresses device 7. In this third case, the packet will be routed to all other devices on that local TP module bus. It should be noted that TP modules, in accordance with exemplary embodiments of the present invention, do not respond to a module broadcast address 7 because of limitations of the gateway. Also, it should be noted that devices will only accept packets having masks A, B, C, or D to which they have been sensitized.

Packet Buffering and Transfer Methodology

In accordance with one embodiment of the present invention, whenever a packet is received by a bus gateway or a bus interface device, it must immediately be transmitted into an internal buffer to be held and await a retransmit command. These buffers are provided for each direction of transfer and work independently to buffer packets transmitted in both directions, such as in the transmit and receive directions. In order to minimize the possibility of aborting a transmission packet, bus devices provide first in first out (FIFO) storage buffers that are at least 4 packets deep in both directions.

System Bus Signals

The various system bus requests executed on the system bus, such as the system bus 102 of FIG. 1, are outlined below in Table 6, for the sake of convenience. The modes associated with each of the respective signals is indicated by the column denoted "M", wherein specific modes U and B indicate unidirection and bidirectional signals, respectively. The column denoted "D" refers to the default state, while "D/L" refers to the number of maximum drivers over loads. The column denoted "TPD" indicates the total propagation delay between the source and destination in nanoseconds.

TABLE 6

| Name | Function | Action | Type | M | D | D/L | TPD |
|---|---|---|---|---|---|---|---|
| SBR(6:0)* | Bus Request | 0-Assert Rqst 1-Negate Rqst | CMOS 5v | U | 0 | 1/1 | 25 |
| SBG(6:0)* | System Bus Grant | 0-Assert Grant 1-Negate Grant | CMOS 5v | U | 0 | 1/1 | 25 |
| SAD(63:0) | Address/Data Bus | Header or Data Value | CMOS 5v | B | 0 | 8/8 | 25 |
| SABB* | Address Bus Busy | 0-Assert Busy 1-Negate Busy | CMOS 5v | U | 0 | 8/8 | 25 |
| SDBB* | Data Bus Busy | 0-Assert Busy 1-Negate Busy | CMOS 3.3v | U | 0 | 8/8 | 25 |
| SBDAL0(2:0) SBDAL1(2:0) SBDAL2(2:0) SBDAL3(2:0) SBDAL4(2:0) SBDAL5(2:0) SBDAL6(2:0) | Bus Destination Address Lines, 3 per receiver* maximum 7 receivers gives 21 signals | Destination Address Value | CMOS 5v | U | 0 | 1/1 | 25 |
| SRBB(6:0)* | Receiver Buffer Busy | 0-Busy 1-Available | CMOS 5v | U | 0 | 1/1 | 25 |
| BDPRES(6:0)* | Board Present | 0-Present 1-Not Present | CMOS 5v | U | 0 | 1/1 | 25 |

Module Bus Signals

The various system bus requests executed on the system bus, such as the system bus 102 of FIG. 1, are outlined below in Table 7, for the sake of convenience. The last four columns express the same quantities associated with the last four columns in Table 6.

TABLE 7

| Name | Function | Action | Type | M | D | D/L | TPD |
|---|---|---|---|---|---|---|---|
| MBR(6:0)* | Bus Request | 0-Assert Rqst<br>1-Negate Rqst | CMOS 5v | U | 0 | 1/1 | 25 |
| MBG(6:0)* | System Bus Grant | 0-Assert Grant<br>1-Negate Grant | CMOS 5v | U | 0 | 1/1 | 25 |
| MAD(63:0) | Address/Data Bus | Header or Data Value | CMOS 5v | B | 0 | 8/8 | 25 |
| MABB* | Address Bus Busy | 0-Assert Busy<br>1-Negate Busy | CMOS 5v | U | 0 | 8/8 | 25 |
| MDBB* | Data Bus Busy | 0-Assert Busy<br>1-Negate Busy | CMOS 5v | U | 0 | 8/8 | 25 |
| MBDAL0(2:0)<br>MBDAL1(2:0)<br>MBDAL2(2:0)<br>MBDAL3(2:0)<br>MBDAL4(2:0)<br>MBDAL5(2:0)<br>MBDAL6(2:0) | Bus Destination Address Lines, 3 per receiver* maximum 7 receivers gives 21 signals | Destination Address Value | CMOS 5v | U | 0 | 1/1 | 25 |
| MRBB(6:0)* | Receiver Buffer Busy | 0-Busy<br>1-Available | CMOS 5v | U | 0 | 1/1 | 25 |
| DVPRES(6:0)* | Device Present | 0-Present<br>1-Not Present | CMOS 5v | U | 0 | 1/1 | 25 |

Module Address Assignments

Table 8 below outlines the module address assignments for the processor system of the present invention. These values are listed in table format for the sake of convenience.

TABLE 8

| MAD | Module | Description |
|---|---|---|
| 0 | SC | System Controller/Bus Controller |
| 1 | SI | Sensor Interface |
| 2 | BM | Byte Memory Module |
| 3 | TPA | Temporal Processor A |
| 4 | TPB | Temporal Processor B |
| 5 | TPC | Temporal Processor C |
| 6 | TPG | Growth Temporal Processor |
| 7 | BCAST | Broadcast Address |

TPA Device Address Assignments

Table 9 below outlines the TPA device address assignments for the processor subsystems. values are listed in table format for the sake of convenience.

TABLE 9

| DDA/SDA | Module | Description |
|---|---|---|
| 0 | BG | Bus Gateway |
| 1 | PPC1 | PPC CPU 1 |
| 2 | PPC2 | PPC CPU 2 |
| 3 | PPC3 | PPC CPU 3 |
| 4–6 | (spare) | |

Bus Interface Device

Figure 2:
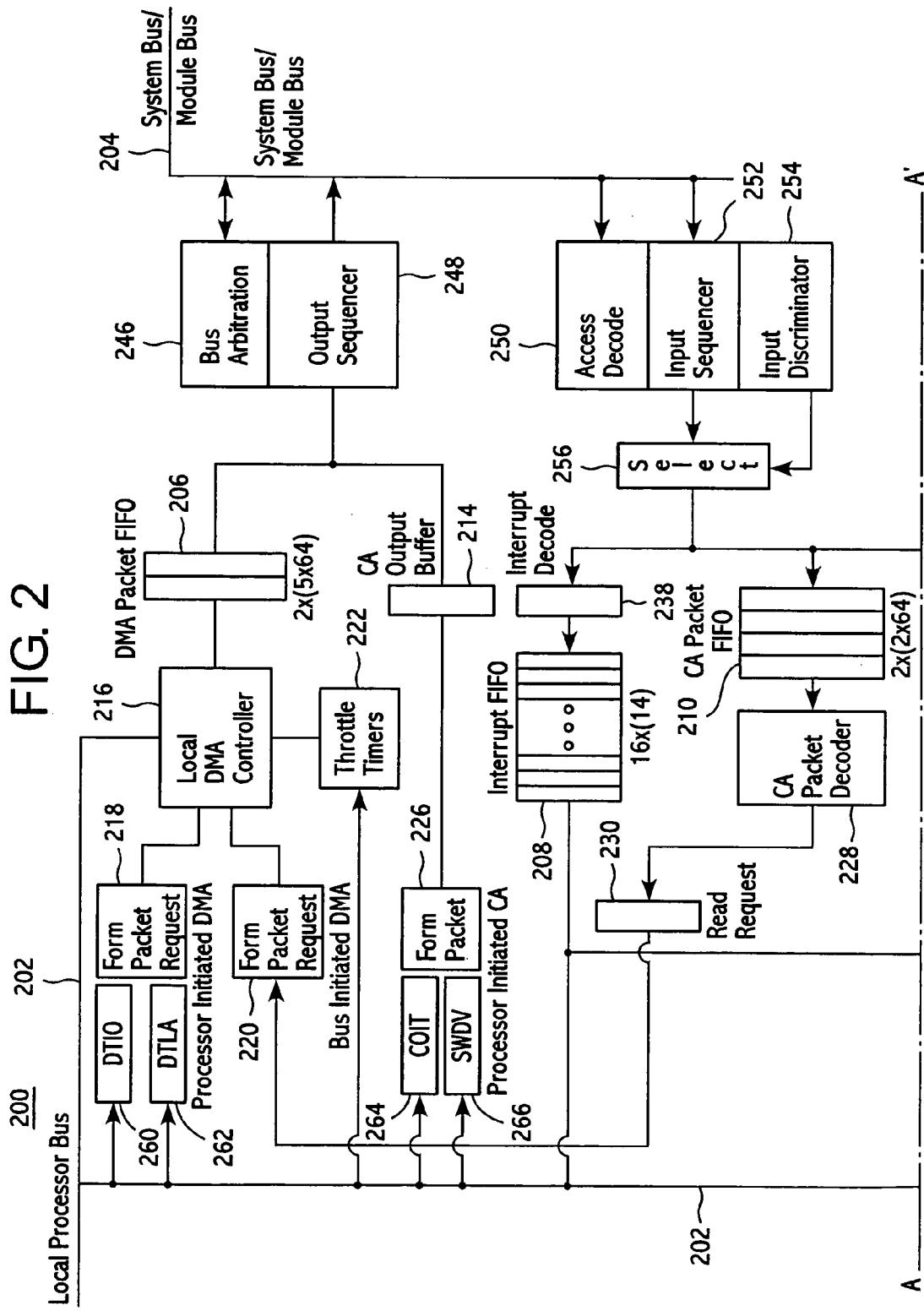
FIG. 2 is an exemplary block diagram illustrating an exemplary bus interface of the present invention.
Figure 2:
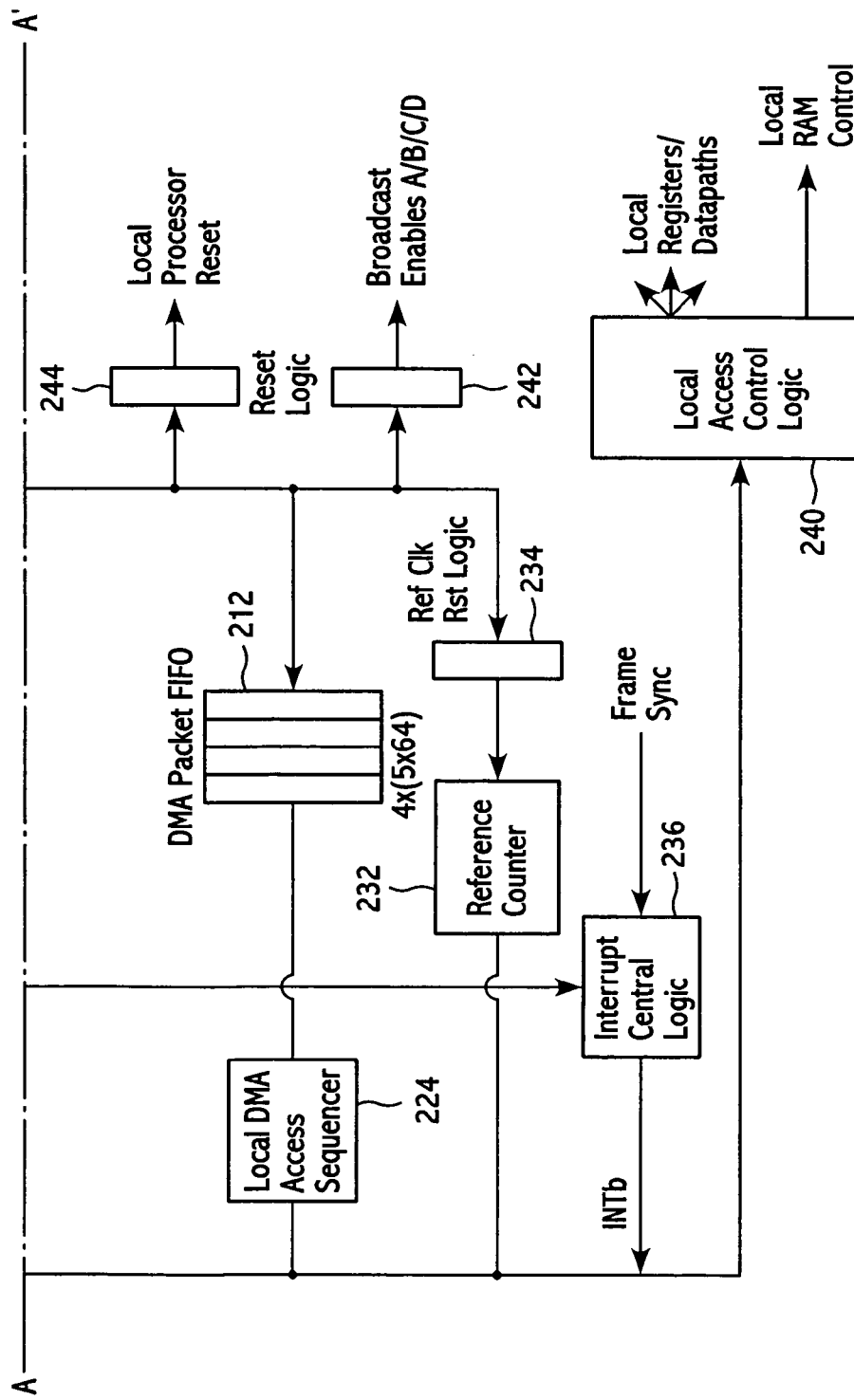

According to one embodiment of the present invention, a bus interface device is responsible for managing all transfers between the processor and the system bus. In FIG. 2, a block diagram of this interface device 200 is shown. The major function of the bus interface shown in the block diagram 200 is to utilize a transmitter and receiver that operate between the local processor bus 202 and the system bus or module bus 204. The bus 204 may be either the system bus 102 or the module bus 122, shown in FIG. 1. The local processor bus 202 is the bus connecting the bus interface device 128 to components within the same node of the module, such as processors and memory, or, in the case of the sensor interface, internal processors and memory. The interface illustrated in the block diagram 200 of FIG. 2 provides the necessary functions to meet the requirements of the system illustrated in FIG. 1, for example. This bus interface also includes support DMA operations and control actions, as used in embodiments of the present invention.

Within the bus gateway buffer block diagram 200, several packet buffers are illustrated, such as the DMA packet FIFO buffer 206, the interrupt FIFO buffer 208, the CA packet FIFO buffer 210, and the DMA packet FIFO buffer 212. In FIG. 2, each of these buffers has a value below which is associated with the size of packets, and/or interrupts stored within the various buffers. It will be recognized by those skilled in the art, however, that these numbers may change according to the processor capabilities within the overall system and bus data transfer speeds. Also included is a CA output buffer 214 for processing various control actions.

Associated with the DMA packet transfers between the local processor bus 202 and the system bus 204 and the DMA packet FIFO buffer 206 is a local DMA controller 216 which processors form packet requests from components 218 and 220. These components that process form packet requests 218 and 220 process processor initiated DMA operations from control registers DTIO and DTLA, and bus initiated DMA operations, respectively. The local DMA controller 216 is also operably connected to a single or group of throttle timers 222. The DMA packet FIFO buffer 212 is connected to a local DMA access sequencer 224 that is connected to the local processor bus 202. A form packet device 226 is connected to the CA output buffer 214 for processing processor initiated CA operations from the two registers: COIT and SWDV for initiating CA operations.

Connected to the CA packet FIFO buffer 210 is a CA packet decoder 228. This CA packet decoder 228 is also connected to the form packet request 220 for bus initiated DMA operations through a read request device 230. A reference counter 232 is connected to the local processor bus 202 and by way of component 234 is operable to transmit reset request signals and transmissions.

An interrupt control logic device 236 is connected to the interrupt FIFO buffer 208 and the local processor bus 202 for controlling interrupt transmission and interpretation. Also for decoding interrupts an interrupt decode component 238 is connected to the interrupt FIFO buffer 208. Controlling all of the processing events within the bus interface 200 is the local access control logic 240. As illustrated by the arrows leaving the right hand side of the local access control logic 240, access is granted thereby to local registers and data paths, and to local RAM control.

Also provided in the bus interface 200 is a broadcast enable device 242 that enables the use of the various broadcast masks A, B, C, and/or D. A local processor reset device 244 containing reset logic is also connected and operable for transmitting various reset requests.

The system bus 204 is connected to the bus interface by way of a bus arbitration element 246, an output sequencer 248, an access decode device 250, and an input sequencer 252. Connected to the access decode device 250 and the input sequencer 252 is an input discriminator 254, which in connection with the input sequencer 252 is connected to a selection device 256 for selecting the input to be sequenced and processed by the interrupt FIFO buffer 208, the CA packet FIFO buffer 210, the DMA packet FIFO 212, or the reference counter 232.

The major functions of the interface 200 illustrated in FIG. 2 include processing commands between the local processor bus and the system or module bus by way of various modules and devices as outlined below.

System/Module Bus Transmit and Receive

The transmitter and receiver sections of the system bus interface are two independent channels that can run completely in parallel. Within each of these sections, two basic types of operations are supported including DMA operations and control operations.

DMA operations involve the automatic movement of data between the host processor memory to and from packets transmitted or received from the system and/or module bus. DMA operations occur as a result of either a processor request, or from packets received from the bus. Processor requested DMA transfers include simple write (SW) functions. Bus requested transfers include, for example, the optional requested write (QW) mode.

Control operations include transfers such as transmission of reception of specialized single-word packets. Control operations can occur as a result of either a processor request, or packets received from the bus. They can affect the host processor memory or the bus interface control registers. The control actions (CA) commands are processor initiated commands that affect the receiving bus controller and/or its host processor. Processor initiated operations involve, for example, simple write requests (SW) and control action (CA) operations. The SW operation, for example, results in a DMA transaction being initiated to transfer a block of data to the destination. The CA operation, on the other hand, involves a single packet write operation to the system bus. For processor initiated DMA operations, only a single transfer at one time may be in progress, and the processor cannot initiate another until the current transfer has been completed.

Control actions (CA) can be used in parallel with the current DMA transaction that may be in progress, and are considered higher in priority. Therefore, the control action packets will preempt the next DMA packet to be transferred over the bus and will be immediately sent upon completion of any current packet transfers. This occurs only after a clear channel on the bus has been granted by a bus grant signal. After the CA packet is sent, the preempted DMA transfer will resume operation under normal operating conditions.

Bus initiated operations, such as the type received by the form packet request device 220, involve, for example, reception of a simple write (SW) and control actions (CA) and the transmission of optional requested write (QW) actions. For SW and many CA operations, the packets are routed to the appropriate buffer for the respective operation. SW and QW operations, in accordance with one embodiment of the present invention, will be sent to a DMA packet buffer that can hold at least 4 packets, or is "4 deep," such as the DMA packet FIFO buffer 212. CA interrupts are routed to an interrupt buffer having positions for at least 16 interrupts, or is "16 deep," such as the interrupt FIFO buffer 208 of FIG. 2. CA reset or broadcast modes, on the other hand, according to one embodiment of the present invention, will have a direct effect and will not require buffering. The optional CA requested read and simple write functions will each have a buffer that is 2 deep, such as CA packet FIFO buffer 210, and DMA packet FIFO buffer 206.

DMA operations are separated from other packets upon receipt, and placed into the interrupt buffer, such as the interrupt FIFO buffer 208. The hardware system balances the flow of DMA by regulating DMA operations with receiver busy indications to the bus arbitrators and thereby prevent overflow of the receivers. Since the bus interface handles DMA operations by stealing cycles on a local host bus, they require little host intervention, except to start the operations, thereby allowing the bus system to maintain effective transfer rates.

Control action (CA) interrupts are separated by other packets upon receipt and placed into the interrupt buffer, such as the interrupt FIFO buffer 208. The design of the operational software, in accordance with one embodiment of the present invention, manages the total number of interrupt packets being sent at any given time, such that the buffer 208 containing 16 locations will not become full. In the event that it does become full, the local receiver will transmit an indication that it is busy to the arbitration unit, and all traffic, such as all DMA and CA operations, will not be able to reach that device until the interrupt buffer is no longer full.

CA interrupts are dependent on local host processor intervention for each interrupt. The local host processor, such as the local access control logic 240, must read all CA interrupts at a rate such that the interrupt buffer 208 does not become full. CA requested read actions (CA-RRD) are designed to involve setting up an optional requested right (QW) operation, which will initiate a transmit DMA operation. According to one embodiment of the present, CA-RRD operations should not be used for general software operations as they can take a long time to complete for packets of large transfer sizes. A CA-RRD action used to set up a requested write (QW) function may be expressed by the designation CA-RRQ. If more than one CA-RRQ action is sent to the receiver, its input buffer could potentially fill or halt, due to unanticipated processing delays, thereby halting all bus traffic. Such a halt in bus traffic would result in device and gateway transmitter time out signals being generated. Therefore, any CA-RRQ actions should only be used to verify downloaded code or carry out test operations.

The transmitter of the bus interface 200 has three sources of access: the processor initiated DMA; optional bus initiated DMA, such as a requested read operation; and processor initiator control actions (CA). Processor initiated DMA operations and bus initiated DMA operations are received by the form packet request devices 218 and 220. DMA operations are set up through a series of control registers that form a packet request to the DMA controller. These control registers, in accordance with one embodiment of the present invention, correlate to the control registers DTIO and DTLA that provide the form packet request device 218 with processor initiated DMA. Once DMA operations have been passed from the packet request devices 218 and 220 to the DMA controller, the controller then carries out transfers from local processor memory, build packets, and stores them in the DMA packet FIFO buffer 206. From this buffer 206, packets will be sequenced to the bus by the arbitration and sequencer logic, such as the bus arbitration device 246 and the output sequencer 248. The DMA packet FIFO buffer 206 provides buffering for two complete five word DMA packets, according to one embodiment of the present invention.

CA operations are sent directly to the CA output buffer 214 where they will be sequenced to the bus by the bus arbitration device 246 and the output sequencer logic device 248. As such, CA operations bypass the DMA packet FIFO buffer 206 and go directly to the output controller, which according to one embodiment of the present invention, comprises a bus arbitration unit 246 and an output sequencer 248.

When simultaneous requests occur between the three transmitter sources, arbitration logic provides prioritization between them. Highest priority is given to control actions (CA), followed by requested read DMA operations, and the lowest priority is given to processor initiated DMA operations.

The receiver portion of the bus interface 200 supports two modes of access from the system bus including reception of DMA requests and control actions. DMA operations are packet oriented with individual packets each initiating a DMA operation. The DMA operation, according to one embodiment of the present invention, initiated by each individual packet is to store four 64 bit data words into host processor memory. DMA operations apply to SW and QW operations. CA operations are single word packets that perform special functions such as interrupts and read requests. Each of these operations is handled differently. Interrupts, for example, according to one embodiment of the present invention, are buffered through a "16 deep" FIFO buffer with a status register, such as the interrupt FIFO buffer 208 shown in FIG. 2. Read requests, on the other hand, according to one embodiment of the present invention, are accepted one at a time and are sent to the transmitter section of the bus interface 200 for DMA processing.

Bus Interface Mechanical Details

The temporal processor bus interface (TPBI) may, in accordance with an embodiment of the present invention comprise a monolithic device within a surface mount package. For example, in accordance with the specific embodiment of the present invention, the TPBI may be located within a 304 pin ceramic quad flat pack (CQFP) surface mount package. In an exemplary embodiment, the TPBI devices should be capable of withstanding a full temperature range of operation (minus 40° C. to 85° C.). The TPBI device should be physically mounted to the temporal processor (TP) circuit board by soldering the leaves, which number 304 in one embodiment, onto a footprint on a circuit cord assembly (CCA) of the TP electronic circuit cord assembly (ECA).

Bus Interface Electrical Details

The TPBI should be configured to provide the necessary signal interfaces needed to support the required control actions and data flow. This includes, for example, interfaces to the processor, which in accordance with an embodiment of the present invention comprises a Power PC (PPC) 124, local memory, which may comprise synchronous (SRAM) 126, and the TP module bus 122. Each of these interfaces is described below in greater detail.

Bus Clocks

The TPBI operates using two separate clock signals. The first clock signal is the signal used on the local bus by the processor (PPC). The second is the clock used on the module bus 122 between various processor modes within the TP. In accordance with an embodiment of the present invention, the local bus clock may operate at 40 MHZ and the module bus clock may operate at 20 MHZ. However, those skilled in the art will recognize that the bus clocks speed may vary greatly, and it is anticipated that as processor speeds increase that the present invention may incorporate bus speeds that are much higher than those listed herein. The TPBI attends to synchronization between the local bus clock and the module bus clock. Additionally, further clocks may be used for a variety of special purposes, such as, for example, a reference clock, and a testing clock for standardization purposes. The clock signals associated with the TPBI are illustrated below in Table 10.

TABLE 10

| Name | Pin # | I/O | Tech | Volt | Cell | Description |
|---|---|---|---|---|---|---|
| CPUCLK | 274 | I | CMOS | 3.3 | ipcnul | 40 MHZ PPC Clock |
| MODCLK | 120 | I | TTL | 5 | ipsnuh | 20 MHZ SysBus Clock |
| REFCLK | 140 | I | TTL | 5 | ipsnuh | System Reference |

Bus Reset

The TPBI is capable of accepting two separate sources of reset signals. The first is from the module bus, which actually originates from the system bus. The second is for emulation support, which is a reset signal that allows for an external development system to control the local PPC. This may be accomplished, for example, via a JTAG test interface as described below. The TPBI generates the local PPC reset from these sources and from module bus commands. The reset signals are shown below in Table 11.

TABLE 11

| Name | Pin # | I/O | Tech | Volt | Cell | Description |
|---|---|---|---|---|---|---|
| SYSRSTb | 69 | I | TTL | 5 | ipsnuh | Module Bus Reset |
| BOOTb | 258 | O | TTL | 5 | ostt06hh | PPC CPU Reset |

PPC Host Interface

The signals shown below in Table 12 make up the PPC interface to the TPBI and allow complete communication between the two devices. In accordance with an embodiment of the present invention, the signals shown in Table 12 below are associated with the Power PC 603P processor. However, as will be appreciated by those skilled in the art, a variety of different processors could be implemented for use with the TPBI of the present invention.

TABLE 12

| Name | Pin # | I/O | Tech | Volt | Cell | Description |
|---|---|---|---|---|---|---|
| ABRb | 249 | I | CMOS | 3.3 | ipcnul | CPU Requests Bus |
| ABGb | 250 | O | CMOS | 3.3 | ontc06ll | CPU Granted Bus |
| ABBb | 234 | I/O | CMOS | 3.3 | bntcnu06ll | Address Bus Busy |
| TT[0:4] | 199,207,217, 247,248 | I/O | CMOS | 3.3 | bntcnu06ll | Transaction Type |

TABLE 12-continued

| Name | Pin # | I/O | Tech | Volt | Cell | Description |
|---|---|---|---|---|---|---|
| TSIZ[0:2] | 230,257,266 | I | CMOS | 3.3 | | Transfer Size |
| TBSTb | 225 | I/O | CMOS | 3.3 | bntcnu06ll | Burst Transaction |
| AACKb | 238 | O | CMOS | 3.3 | ontco6ll | Address Acknowledge |
| ABUS[0:1] | 188,189 | I/O | CMOS | 3.3 | bstcnu06ll | Region Select |
| ABUS [10:31] | 191,192,194,195, 196,198,200,202, 203,204,206,208, 212,213,214,216, 218,220,221,222, 165,166 | I/O | CMOS | 3.3 | bstcnu06ll | Location Select |
| DBGb | 253 | O | CMOS | 3.3 | ontc06ll | Data Bus Grant |
| TSb | 224 | O | CMOS | 3.3 | ontc06ll | Transfer Start |
| DBBb | 242 | O | CMOS | 3.3 | bntcnu06ll | Data Bus Busy |
| DTAb | 256 | O | CMOS | 3.3 | ontc06ll | Data Trans Ack |
| DBUS [0:63] | 168,169,170,172, 173,175,176,177, 179,180,182,183, 184,228,229,231, 276,277,279,280, 281,283,284,286, 287,288,292,293, 294,296,297,299, 300,301,303,304, 2,3,4,6,7,9,10,11, 13,14,18,19,20,22, 23,25,26,27,29,30, 32,33,34,36,37,39, 40,41 | O | CMOS | 3.3 | bntcnu12ll | Data Bus |
| INTb | 259 | O | CMOS | 3.3 | ontc08ll | CPU Interrupt |

RAM Interface

Within each TP is provided a processor 124 and local memory 126. In accordance with one embodiment of the present invention, the local memory within the TP may comprise SRAMs, which may, for example, be high-speed synchronous devices for use in connection with the PPC CPU of each TP. The signals shown below in Table 13, along with a control programmable array logic (PAL) device, provide the capability to perform accesses to the RAM.

TABLE 13

| Name | Pin # | I/O | Tech | Volt | Cell | Description |
|---|---|---|---|---|---|---|
| SEL[3:0] | 254,252, 243,241 | O | CMOS | 3.3 | ontc12ll | RAM Bank Select |
| BSEL[7:0]b | 271,270, 269,267, 265,263, 262,261 | | | | ontc12ll | |
| Gb | 233 | O | CMOS | 3.3 | ontc12ll | Output Enable |
| ADVb | 226 | O | CMOS | 3.3 | ontc12ll | Advance Burst Counter |
| ADSPb | N/A | O | CMOS | 3.3 | ontc12ll | New Read Add |
| ADSCb | 239 | O | CMOS | 3.3 | ontc12ll | New Address |
| SWb | 237 | O | CMOS | 3.3 | ontc12ll | Sync Write |
| SGWb | 235 | O | CMOS | 3.3 | ontc12ll | Sync Global Write |

Module Bus Interface

The module bus 122 is the primary data path that interfaces the local processors within the TPs, or PPCs, to other processors, and to the system bus 102. Below in Table 14 are shown various signals associated with the module bus interface, according to an embodiment of the present invention.

TABLE 14

| Name | Pin # | I/O | Tech | Volt | Cell | Description |
|---|---|---|---|---|---|---|
| BUSID [2:0] | 57,52,47 | I/O | TTL | 5 | ipsnuh | Module ID for System Bus |
| CARDID [2:0] | 157,148, 144 | I/O | TTL | 5 | ipsnuh | Device CPU ID for Module Bus |
| MBRb | 123 | I/O | TTL | 5 | ontt08hh | Module Bus Request |
| MBGb | 124 | I/O | TTL | 5 | ipsnuh | Module Bus Grant |
| MBDAL [2:0] | 133,132, 131 | I/O | TTL | 5 | ontc08hh | Mod Bus Destination Add |
| MABBb | 127 | I/O | TTL | 5 | bnthnu08hh | Mod Bus Add Strobe |
| MDBBb | 128 | I/O | TTL | 5 | bnthnu08hh | Mod Bus Data Strobe |
| MAD [63:0] | 161,159, 158,156 154,153, 152,150 149,147, 145,143, 142,136, 129,122 117,116, 115,113, 112,111, 109,108, 107,105, 104,103, 99,98,97, 95,94 93,91,90, 89,87 86,85,83, 82,81, | I/O | TTL | 5 | bnthnu08hh | Mod Bus Add and Data Lines |

TABLE 14-continued

| Name | Pin # | I/O | Tech | Volt | Cell | Description |
|---|---|---|---|---|---|---|
| | 79,78,77, 75,74, 73,71,70, 68,64, 63,61,59, 58,54 53,51,49, 48,46 | | | | | |
| MRBBb | 125 | I/O | TTL | 5 | ontc08hh | Receiver Busy Flag |

Serial Debug

The signal shown below in Table 15 support a serial communications interface for the TPBI to connect with a host debugging system. One example of such a serial communications interface that may be used in accordance with the signals provided in Table 15 is an RS-232 format. However, as will be appreciated by those skilled in the art, other formats may be utilized with the present invention for serial debugging purposes. The signals shown in Table 15 operate using five volts, and may require transformation to the proper voltages for the serial communications interface format being used, such as RS-232 voltage levels, and the like.

TABLE 15

| Name | Pin # | I/O | Tech | Volt | Cell | Description |
|---|---|---|---|---|---|---|
| UARTTX | 135 | O | TTL | 5 | ontt08hh | Serial Tx |
| UARTRX | 137 | O | TTL | 5 | ipsnuh | Serial Rx |

JTAG Test Interface

The signals set forth below in Table 16 provide support for in-circuit testing, in accordance with the Joint Test Action Group (JTAG) standard 1149.1.

TABLE 16

| Name | Pin # | I/O | Tech | Volt | Cell | Description |
|---|---|---|---|---|---|---|
| TDIN | N/A | I | TTL | 5 | | Test Data In |
| TCLK | N/A | I | TTL | 5 | | JTAG test clock |
| TDOUT | N/A | O | TTL | 5 | | Test Data out |
| TMODE | N/A | I | TTL | 5 | | Test Mode in |

Specialized TTBI Functions

The signal shown below in Table 17 provides special functionality for the TTBI. Specifically, the signal shown below provides a frame synchronization signal (FSb). This signal, in accordance with exemplary embodiments of the present invention, is an interrupt that allows processing activity to be synchronized to a video frame synchronization signal.

TABLE 17

| Name | Pin # | I/O | Tech | Volt | Cell | Description |
|---|---|---|---|---|---|---|
| FSb | 62 | I | TTL | 5 | ipsnuh | Frame Sync |

Power/Ground

The signals shown below in Table 18 set forth the power and ground connections for the TPBI. In accordance with an embodiment of the present invention, the TPBI requires primarily five volts to power its core and module bus I/O. The 3.3 volt power is used for interface drivers and receivers that are connected to the PPC and synchronous SRAM.

TABLE 18

| Name | Pin # | Cell | Description |
|---|---|---|---|
| +5 | 15,43,65,100,118,139,162,185, 209,244,272,289 | VDDWCLS | 5 v Core Power |
| GND | 16,44,66,101,119,138,163,186, 210,245,273,290 | VSSC | Core Ground |
| +5 | 50,60,72,80,88,96,106,114, 126,134,146,155 | VDDPERH | 5 v Interface power |
| GND | 45,55,67,76,84,92,102,110,121, 130,141,151,160 | VSSPERH | Peripheral Ground Ref for +5 V |
| +3.3 | 5,12,21,28,35,42,167,174,181, 190,197,205,215,223,232,240, 251,260,268,278,285,295,302 | VDDPERL | 3.3 v Interface pwr |
| GND | 1,8,17,24,31,38,164,171,178, 187,193,201,211,219,227,236, 246,255,264,275,282,291,298 | VSSPERL | Peripheral Ground Ref for +3.3 v |

Functional Architecture

The major functions of the TPBI device include multiple functions. For example, the TPBI provides PPC local bus accesses to memory, and TPBI registers. Additionally, the TPBI provides a PPC interrupt. The TPBI also provides a reference timer, and a diagnostic universal asynchronous receiver transmitter (UART). In addition to all of these functions, the TPBI, provides principle system bus transmit and receive functionality.

PPC Local Bus

The TPBI provides logic to support PPC local bus operations. The TPBI is set up to support a minimum configuration that optimizes space utilized by each PPC. The TP is an array processor based on the PPC, whereby each processor is an element in the array, each having its own local memory. The local memory of each processor, allows each processor to run at optimal speed. This memory may consist of synchronous SRAM in order to optimize speed and minimize logic density. A module bus connection is also provided for each PPC in the array.

Thus, the present invention allows for each PPC to run independently, and yet allows for a highly interconnected and interrelated processing schema. The TPBI provides a DMA function for the module bus that allows data transfers to occur in the background of processor operation.

The general transfer mode for the PPC local bus, which connects the processors 124 with the memory 126 and the bus interface device 128, operates in a packet fashion, requiring the support for single burst mode transfers. The TPBI supports processor accesses to the local memory, which may be synchronous SRAM, for example, as well as allowing access to the internal registers of the TPBI itself. The internal registers of the TPBI support TPBI functions including interrupts, reference timer, UART, and system bus accesses.

Processor Interrupts

The TPBI supports a series of simple interrupts that may be required during temporal processing. These include control action (CA) interrupts and frame synchronization. Through the use of the control registers TPBI, these interrupts can be easily enabled, masked, and cleared.

The CA interrupts are used to signal to the processor that another device on the system/module bus requires its attention, and may have completed a DMA transfer to the local PPC. The frame synch interrupt can be used to synchronize the PPC software execution with the sensor activity provided by the sensor interface 130 of the system 100, shown in FIG. 1. As previously discussed, this sensor activity provided by the SI 130 may comprise sensor video activity or a variety of other sensor activity.

Reference Timer

The TPBI provides a 64 bit counter that is used to support a system reference clock. This counter may be incremented by an external signal that is resynchronized to the local PPC bus clock, and used to increment the counter. The counter can be reset by a system bus command. The clock may be controlled by an external device to allow all counters in the system to be synchronized together. This allows the present invention to provide a consistent reference time that allows all processors in the system to time stamp data transferred via the system bus and/or module buses.

Diagnostic UART

A single channel universal asynchronous receiver transmitter (UART) is provided by the TPBI for diagnostic purposes. This UART is very simple, having only transmit and receive lines for data, and no hand-shaking lines. The baud rate and number of bits used by this UART are programmable. Generally, in accordance with an embodiment of the present invention, the device is set for no parity.

A receive interrupt is provided to allow for background debugging operations. Thus, a task can be provided to service the UART inquiries while the processor is providing other system processing. Alternatively, the operational mode could be halted, while providing a dedicated task for UART debugging.

System Bus Transmit and Receive

The transmitter and receiver sections of the system bus interface comprise two independent channels that can run completely in parallel. Within each of these sections, two basic types of operations are supported, and include DMA and control operations.

DMA Operations

DMA Operations involve the automatic movement of data between the host processor memory to and/or from packets transmitted or received from the system and/or module bus. The DMA operations can occur as a result of either a processor request, or from packets received from the bus. Processor requested DMA transfers include simple write (SW) operations. Bus requested transfers include the optional requested write (QW) transfers.

Control Operations

Control operation transfers involve transmission or reception of specialized single word packets. Control operations can occur as a result of either a processor request or packets received from the bus. They can affect the host processor memory or bus interface control registers. The control action (CA) commands are processor initiated commands that affect the receiving bus controller and/or its host processor.

Processor Initiated Operations

Processor initiated operations involve SW and CA operations. The SW operations cause a DMA transaction to be initiated to transfer a block of data to the specified destination. The CA operation is simply a single packet write to the system bus. For processor initiated DMA, only a single transfer at a time may be in progress, and the processor cannot initiate another until the current transfer has completed.

Control actions (CAs) can be issued in parallel with a current DMA transaction that may be in progress. The CAs are generally considered higher in priority, and CA packets will pre-empt the next DMA packet, and will be sent immediately upon completion of any current packet transfers, and upon being granted a clear channel on the bus. After the CA packet is sent, the pre-empted DMA operation will resume normal transfer. For further discussion of the manner in which the types of transactions relate, and are enacted on the system bus, the reader is directed to the copending patent application cited above.

Bus-Initiated Operations

Bus-initiated operations involve reception of simple write (SW) and control action (CA) packets, and the transmission of the optional requested write (QW) actions. For SW operations, and most CA operations, packets are routed to the appropriate buffer for the corresponding operation. In accordance with an embodiment of the present invention, SW and QW packets will be sent to a four-deep DMA packet buffer, and CA interrupt would be routed to a 16-deep interrupt buffer. The reset and broadcast modes associated with the CAs will have a direct effect, and do not require buffering. The optional CA requested read and simple write actions will each have a two-deep buffer.

DMA operations are separated from the packets upon receipt, and placed into the interrupt buffer. The hardware system will balance the flow of DMA by regulating DMA packet transmissions with receiver busy indications to the bus arbiters that will prevent the overflow of the receivers. Since DMA operations are handled by the bus interface by using cycles on the local host bus, they require little host intervention, except, for example, to initiate them. Because little intervention is required by the host, this allows the system bus to maintain effective transfer rates.

The CA Interrupts are separated from other packets upon receipt, and placed into the interrupt buffer. The design of the operational software in accordance with the embodiment of the present invention, manages the total number of interrupt packets being sent at any given time, such that the 16-deep buffer of the receivers will not become full. However, in the event that it does become full, the local receiver will indicate that it is busy, using the appropriate receiver busy indications to the arbitration unit, and all traffic to the device (i.e., DMA and CA packets) will not be able to reach that device until the interrupt buffer is no longer full. The CA interrupts are dependent upon local host processor intervention on each interrupt, which must read them at a rate to prevent the interrupt buffer from becoming full.

CA requested read (CA-RRD) transactions are optional. These signals involve setting up a requested write (QW) operation which is operable to initiate a transmit DMA operation. However, those skilled in the art will appreciate that CA-RRD operations generally should not be used for general software operations because they can take a long time to complete large transfer sizes. Additionally, if more than one CA-RRD operation is sent to a receiver, its input buffer could fill, thereby causing the receiver to jam, which in turn would halt all bus traffic to the receiver. In such an instance, the device and gateway transmitters would exceed the maximum time allowable causing a time-out. Thus, CA-RRD should generally only be used to verify downloaded code or to carry out test operations.

Bus Interface Device Transmitter

The transmitter has three sources of access, including the processor initiated DMA, the optional bus initiated DMA, (i.e., requested read), and the processor initiated control actions (CA).

DMA operations in accordance with the embodiment of the present invention, are set up through a set of control registers that request a packet request to the DMA controller. This controller carries out transfer from the local processor memory, and builds and stores packets in the DMA packet buffer (FIFO) 206. From that packet FIFO 206, the DMA packets will be sequenced to a bus 204 by the bus arbitration logic 246 and output sequencer logic 248. The DMA FIFO provides buffering for two complete five word DMA packets.

CA operations are sent directly to the CA output buffer 214, where they will be sequenced to the bus 204 by the bus arbitration logic 246 and output sequence or logic 248.

Thus, in accordance with the present invention, the bus interface device advantageously allows CAs to bypass the DMA FIFO, and go directly to the output sequencer 248.

When simultaneous requests occur between the three transmitter sources, arbitration logic 246 shall provide for prioritization between each of the requests. The highest priority is given to control actions, and then requested read DMA, and the lowest priority is given to the processor initiated DMA operations.

Bus Interface Receiver

The receiver of the bus interface device, in accordance with an embodiment of the present invention, supports two modes of access from the system bus. Specifically, the receiver of the present invention provides support for reception of DMA requests and control actions.

DMA operations are packet oriented with individual packets each initiating a DMA operation. In accordance with an embodiment of the present invention, such a DMA operation includes storing four 64-bit data words into the host processor memory. DMA operations apply to SW and QW operations.

CA operations are single-word packets that perform special functions. Some special functions performed by the CA operations include interrupts, read-requests, and the like. Each of these operations is handled differently. For example, interrupts are buffered through a 16 deep FIFO 208 with a status register. Read requests are accepted one at a time and sent to the transmitter section for DMA processing.

Control Registers

The bus interface device of the present invention has several internal registers that are mapped to the processor memory spaced of its host. These registers are discussed in greater detail below.

A DMA transmit initiate operation (DTIO) register 260 is used to configure and initiate a transfer, as well as to monitor its progress. Transfers begin either by writing a 1 to the initiate transfer (TINIT) bit, or by a system bus requested read control action. The bus interface will then carry out a transfer of any number of packets indicated, marking the first and the last packet with the respective action code. Single-word transfers are also supported, and may be indicated by setting the transaction size variable (TSIZE) to zero and the burst size (BSIZE) variable to zero. A value of zero for BSIZE defines a burst size of one for single word transfers, or single word packets. A value of one for BSIZE indicates a burst size of four for DMA transfers (i.e., a normal four word package). Transfers larger than single-word transfers will have some value other than zero for TSIZE and a 1 for BSIZE, which will result in a total number of packets being sent that is equivalent to the value TSIZE divided by four. For values of TSIZE that are not exactly divisible by four, the remaining words in the last packet will be padded with zeros, that is zeros will be added to the packet where there is no data present. Upon completion of the transfer, the local bus interface will set the transfer complete bit (TCPLT).

The DTIO register 260 serves two purposes. First, as a write register, it provides a path for the processor to request DMA transfers from the local memory 126 to the system bus 102. Second, as a read register, it indicates the current status of the transmitter. This includes, for example, indicating which source made a transmit DMA request. The source can be either the local processor, or a requested read from the system bus. The other bits contained in the status word pertain to the operation currently being executed by the transmitter, which is not necessarily that which may have been requested by the processor. If the transaction were to be requested by the processor while a current transaction is in progress, it would be ignored.

A transmitter time-out function may be implemented, which will monitor pending transfer requests. This monitoring will determine whether or not various packet transfer requests have become stalled. If, after a time-out interval, the packet transfer operation is not completed, an interrupt will be generated for the processor, and the transaction time-out (TTMO) flag will be set. In accordance with a specific embodiment of the present invention, a time-out interval of one millisecond may be provided. However, those skilled in the art will recognize that a time-out interval of varying length could be used, depending upon the needs and desires of the users of the system serviced by the system bus of the present invention.

A transfer abort mechanism may be provided for both CA and DMA transfer operations. This mechanism can be controlled through the request registers of the present invention. These request registers include, for example, the DMA transmit initiate operation (DTIO) register and the control operation initiate transmit (COIT) register. The transfer abort mechanism is primarily intended to abort locked transactions, which result in a transmitter time-out. Setting the abort flag will terminate the transaction in progress by negating the current bus request and exiting the DMA transfer route. This termination is effective for both CA and DMA operations, and by exiting the transfer route in the case of DMA packet transfers, the transfer abort mechanism prevents the next operation from being requested. The next (the abort) flag will be set in the DTIO 260 or COIT 264. For DMA aborts, the transaction complete (TCPLT) bit will also be set in the DTIO 260.

Status bits set in the DTIO 260 and COIT 264 registers will remain until another command word is written, or until a null command word is written. A null command occurs when the initiate transfer bit (TINIT) is not set in the command word. In this manner, a completion interrupt may be removed. Such a completion interrupt may be generated to the host processor after the last DMA packet of a block transfer has been sent.

The DMA transmit local address (DTLA) register 262 also behaves in a similar fashion as the DTIO 260. As a write register, the DTLA 262 allows the processor to set the local transmit DMA address. As a read register, the DTLA 262 can contain either the requested processor local address, or the system bus requested read local address, depending upon the current mode of transfer, which is indicated by the current request originator (ORIGIN) bit of the DTIO 260.

Valid transaction types for DMA transactions include simple write (SW) the optional requested write (QW), and any of the control actions (CA).

The signals associated with the DMA transmit initiate operation (DTIO) buffer 260 are shown below in Table 19. The address associated with these signals is 00000000 MSW(0:31), 00000004 LSW(32:63).

TABLE 19

| PPC Bit(s) | Name | Function | Mode | |
|---|---|---|---|---|
| 0:11 | TSIZE | Transaction Size | R/W | 1 to 4096 Packets (Val 0 = 4096 Packets) |
| 12:16 | ACODE | Action Code | R/W | (51:50) - Broadcast Code (00) = A, (01) = B, (10) = C, (11) = D, (49:47) = set to 0 |
| 17 | ORIGIN | Current Request Originator | R/W | 0 - Local PPC CPU 1 - Sys Bus Read Request |
| 18:19 | TTYPE | Transaction Type | R/W | (See Transaction Type Table) Must be (00) for this operation |
| 20:25 | DDA | Destination Device Address | R/W | 43:41 = Module (ECA) Address 40:38 = Device Address |
| 26 | DTXAV | Transmitter Buffer Available | R/O | 1 = Available 0 = Busy |
| 27 | ABORT | User Abort | R/W | 1 = Abort Current Operation 0 = No Action |
| 28 | TACTIVE | Transfer Active | R/O | 1 = Active |
| 29 | TERR | Transmitter Time-out | R/O | 1 = Time-out (R/O) |
| 30 | TCPLT | Transfer Complete | R/O | 1 = Transfer Complete (R/O) |
| 31 | TINIT | Initiate Transfer | R/W | 0 = No operation in progress 1 = DMA Transfer in progress |
| 32:63 | DMAD | Device Memory Address for Transfer | R/W | Usually refers to Destination Memory Address. 64 Bit oriented addresses |

(1) DMA mode supports SW, QW, and BWA/B/C/D types only

The signals associated with the DMA transmit local address, (DTLA) buffer 262 are shown below in Table 20. The address associated with these signals is 0000020 MSW (0:31), 0000024 LSW(32:63).

TABLE 20

| PPC Bit(s) | Name | Function | |
|---|---|---|---|
| 0:31 | <spare> | | |
| 32:63 | LMAD | Local Memory Address for DMA Transfer | For Simple Write Truncations Byte Oriented Address |

Processor Initiated Control Operations

The control operation initiate transmit (COIT) register 264 is used to configure and initiate a control operation transfers, as well as to monitor their progress. Transfers begin by writing a 1 to the initiate transfer (TINIT) bit. The bus interface will then carry out a transfer by sending a header along with a single data word for the control function.

Upon completion of the transfer, the local bus interface will set the TCLPT bit. If the bus interface was unable to transmit the packet, and had made multiple attempts to do so, the transmitter time-out (TERR) flag will also be set. This flag will not be set for errors that occurred in transit. In such cases, where errors occur in transit, a bus error message (BESR) will be received and stored.

Valid transaction types for the control operation initiate transmit, (COIT) register include read requests (RQ) and control actions (CA). Values associated with the (COIT) register 264 are shown below in Table 21. These values correspond to an address of 0000040 MSW(0:31), 00000044 LSW(0:31).

TABLE 21

| PPC Bit(s) | Name | Function | Mode | |
|---|---|---|---|---|
| 0:11 | XFRSIZ | Transfer Size in Packets 1–4096 | R/W | Only Applicable to Requested Read (AC = 00011). When 0 signifies 4096 Packets |
| 12:16 | ACODE | Action Code (AC) | R/W | (See Action Code Table) |
| 17 | | | R/W | Must be 0 |
| 18:19 | TTYPE | Transaction Type | R/W | Must be (11) to function |
| 20:25 | DDA | Destination Device Address | R/W | 43:41 = Module (ECA) Address 40:38 = Device Address |
| 26 | CTXAV | Transmitter Available | R/O | 1 = Available 0 = Busy |
| 27 | ABORT | User Abort | R/W | 1 = Abort Current Transfer 0 = No Action |
| 28 | TACTIVE | Transfer Active | R/O | 1 = Active |
| 29 | TERR | Transmitter Time-out | R/O | 1 = 40 µs time-out (R/O) |
| 30 | TSTAT | Transfer Status | R/O | 1 = Transfer Complete (R/O) |
| 31 | TINIT | Initiate Transfer | R/W | 0 = No operation in progress 1 = DMA Transfer in Progress |
| 32:63 | CAVAL | Value for Transaction | R/W | Varies depending on Action Code only for the following: 00000 - (14:0) Interrupt Info 00011 - Dest Mem Address Otherwise should be all 0's |

Values associated with the single word data value (SWDV) register 266 are shown below in Table 22. The value set forth below in Table 22 correspond to an address of 00000060 MSW(0:31), 00000064 LSW(32:63).

TABLE 22

| PPC Bit(s) | Name | Function | |
|---|---|---|---|
| 0:63 | LDAT | Source Device Address (byte address) but must be word aligned | Used only for Requested Read Operations otherwise should be set to all zero's. |

Control Operation Status Registers

The control operation status registered identify the nature of the control word received from the system or module bus to facilitate handling by the bus interface device.

Interrupt Buffer Register (IBR)

The interrupt buffer register (IBR) contains interrupt information for the first interrupt in the interrupt FIFO. In accordance with the embodiment of the present invention, a FIFO 208 that is 16 deep by 14 wide is provided to allow buffering of up to 16 bus initiated interrupts. Each time this register is read, the current value is overwritten by the next on the FIFO. Thus, the host processor must either act on the interrupt or store its data memory. Values associated with the IBR are shown below in Table 23. These values correspond to an address of 00000080 MSW(0:31), 00000084 LSW(32:63).

TABLE 23

| PPC Bit(s) | Name | Function | Mode | |
|---|---|---|---|---|
| 0:44 | N/A | | | Always Zero |
| 45 | DMAFULL | DMA Receive Buffer Full (4 packets) | R/O | Indicates probable overrun condition |
| 46 | INTFULL | Interrupt Buffer Full (16 Interrupts) | R/O | Indicates probable overrun condition |
| 47 | RRDFULL | Requested Read Buffer full (2 requests) | R/O | Indicates probable overrun condition |
| 48 | N/A | | | Always Zero |
| 49 | IVLD | Interrupt Valid | RC/O | Clear when read |
| 50:55 | IDEV | Interrupting Device | RC/O | Source Device Address |
| 56:63 | IVCT | Interrupting Vector | RC/O | Vector or Command |

RC/O—Read Clear Only, value is cleared when read

Interrupt Control Register (ICR)

The interrupt control register (ICR) is a master control register for interrupts, whose values are set forth below in Table 24. The ICR is also used for other control functions associated with the TP bus interface which are also listed below in Table 24. These values correspond to the address 000000A0 MSW(0:31), 000000A4 LSW(32:63).

TABLE 24

| PPC Bit(s) | Name | Function | Mode | |
|---|---|---|---|---|
| 0:8 | | Not Used | R/O | Always Zero |
| 9 | TTMO_CLR | | | |
| 10 | CPURSTI | System bus actuated reset (Internal) | R/O | Internal signal received as CA |
| 11 | CPURSTO | System bus actuated reset (gated) | R/O | Gated signal to local Power PC CPU |

TABLE 24-continued

| PPC Bit(s) | Name | Function | Mode | |
|---|---|---|---|---|
| 12 | RELRST | Temporarily Release CPURSTO for test purposes | R/W | 1 = Release Reset until next CPURSTI transition. 0 = No Action |
| 13 | CARQT_CPLT | Control Action Request Complete | R/O | 1 = Complete |
| 14 | CARQT_IEN | Control Action Xmit Completion Interrupt | R/W | 1 = Enable 0 = Disabled (R) |
| 15 | TRQT_CPLT | DMA Transfer Request Complete | R/O | 1 = Complete |
| 16:31 | BRVID | Uart Baud Rate Divide based on CPU Clock | R/W | h0001 value on Reset |
| 32:33 | CHARS | Uart Number of bits in a character | R/W | 00 - 5 bits 01 - 6 bits 10 - 7 bits 11 - 8 bits (R) |
| 34 | RxOvf | Receiver Overflow | R/O | Cleared on next data |
| 35 | RxErr | Receiver Error | R/O | Cleared on next data |
| 36 | RxAvail | Receiver Data Available | R/O | |
| 37 | TxEmpty | Transmitter Empty | R/O | Ready for next char |
| 38:40 | MYMOD | Local Module Address | R/O | |
| 41:43 | MYDEV | Local Device Address | R/O | |
| 44 | FSb | Frame Sync | R/O | Discrete Value |
| 45 | TTMOINT | Transmit Timeout Interrupt Status | R/O | 1 = Asserted |
| 46 | TTMO_ENB | Transmit Timeout Interrupt Enable | R/W | 1 = Enabled 0 = Disabled (R) |
| 47 | TRINV | UART Transmit Data Invert | R/W | 1 = Inverted 0 = Non-Inverted (R) |
| 48:51 | BCENBL | Broadcast Enable | R/O | Broadcast modes enabled |
| 52 | | Not Used | R/O | Always Zero |
| 53 | UBIT | UART Internal Loopback Test Mode | R/W | 1 = Internal Loopback 0 = Normal Tx/Rx (R) |
| 54 | UTIEN | UART Transmit Complete Interrupt Enable | R/W | 1 = Enabled 0 = Disabled (R) |
| 55 | DIEN | DMA Completion Interrupt Enable | R/W | 1 = Enabled 0 = Disabled (R) |
| 56 | URIEN | UART Receive Data Available Interrupt Enable | R/W | 1 = Enabled 0 = Disabled (R) |
| 57 | FSCLR | Frame Sync Interrupt Condition Clear | W/O | Clears out current FS interrupt condition |
| 58 | FSPOL | Frame Sync Interrupt Polarity | R/W | 1 - Rising Edge 0 - Falling Edge (R) |
| 59 | FSIEN | Frame Sync Interrupt Enable | R/W | 1 = Enabled 0 = Disabled (R) |
| 60 | CAIEN | Control Action Interrupt Enable | R/W | 1 = Enabled 0 = Disabled (R) |
| 61 | IBE | Interrupt Buffer Enable | R/W | 31 - Enable buffer to recieve interrupts. 0 - Buffer Disabled Interrupts will be lost (R) |
| 62 | IBC | Interrupt Buffer Clear | R/W | 1 - Clear Out Interrupts in buffer will be lost 0 - No action (R) |

TABLE 24-continued

| PPC Bit(s) | Name | Function | Mode | |
|---|---|---|---|---|
| 63 | INTAVAL | Interrupt Available | R/O | 1 - Next interrupt os available in the buffer<br>0 - No interrupts in buffer |

RC/O—Read Clear Only, value is cleared when read
(R) Initial Value on Reset

Reference Count Register (REFCNT)

The reference count register (REFCNT) contains the current value of the reference counter that is controlled through the system bus and clocked by the system controller to provide a common reference value throughout the system. This REFCNT register is read only to the local host, in accordance with an exemplary body of the present invention, and can be cleared by the system controller over the system bus. The address corresponding to this register is 000000C0 MSW(0:31), 000000C4 LSW(32:63).

Universal Asynchronous Receiver Transmitter (UART) Register

The universal asynchronous receiver transmitter (UART) is used to both transmit and receive data operations for the UART. The address associated with this register is 000000E0 MSW(0:31), 000000E4 LSW(32:63). Bits 56:63 are used, and the reset 0:55 values do not matter, and are of an unknown value, in accordance with an embodiment of the present invention.

Read operations performed involving the UART register result in the value of the UART receiver buffer being presented to the bus. Write operations to the UART register will result in a character from bit 7:0 being written to a transmitter. The transmitter will then begin sequencing on the receive line of the TPBI device. If the address line of the UART control register, ADR 29, which is used as a control unit for the transmitter, is high or the operation is a burst to the transmitter, the register will begin the serial transfer. If, on the other hand, the ADR 29 is low, the output register is given the new value, but the transmitter will not initiate a transmit. The ADR 29 modifies the address of the UART from 000000E0 (for ADR 29=0) to 000000E4 (for ADR 29=1).

Arbitration Logic

Arbitration logic, according to one embodiment of the present invention, controls access to the module bus from the bus gateway, such as the bus gateway 120 shown in FIG. 1, and other devices on the module bus. It receives bus requests (BR) from each of the module bus devices, including, for example, the system bus to module bus repeater (STMBR) in the gateway. Destination device addresses being requested are also received by the arbitration logic. The arbitration logic then prioritizes the requests according to a modified rotating priority scheme and grants access to the bus accordingly. One example of such a rotating priority scheme used in one embodiment of the present invention is a round-robin-type of rotating priority scheme. Messages to be transmitted to module devices on the module bus include a module bus destination address line (MBDAL). This MBDAL, however, does not indicate which module is being accessed, or that the access is on or off the current module associated with the module bus. For example, a module device address of 0 indicates that the gateway is being referenced. However, an operation addressed in this manner has no meaning, as a destination device address is necessary for transfers between multiple temporal processor (TP) modules.

To remedy problems in accessing devices in different TPs, the bus interface may perform a comparison of the device address in the requesting header with its local module address. If it is detected that these two addresses are not equal, then the access requested is in a different module, and the MBDAL signal is set to indicate the particular destination device to be accessed. The destination device may be accessed by allowing a packet be sent to the gateway and repeated to another gateway, potentially of another, separate TP module. Therefore, according to one embodiment of the present invention, the module device address 0 contained within an MBDAL signal indicates that a module address has been selected in a different TP, thereby eliminating the need for additional signals to the bus gateway unit.

Clock Distribution

The system bus of the present invention is a fully synchronous bus system that supports high data rates. In accordance with one embodiment of the present invention, data transmission speeds of up to 128 Mb/s throughput may be sustained. It will be appreciated by those skilled in the art, however, that as processor and bus speed limitations are reduced, this rate may increase greatly, and is still within the scope of the present invention.

Figure 3:
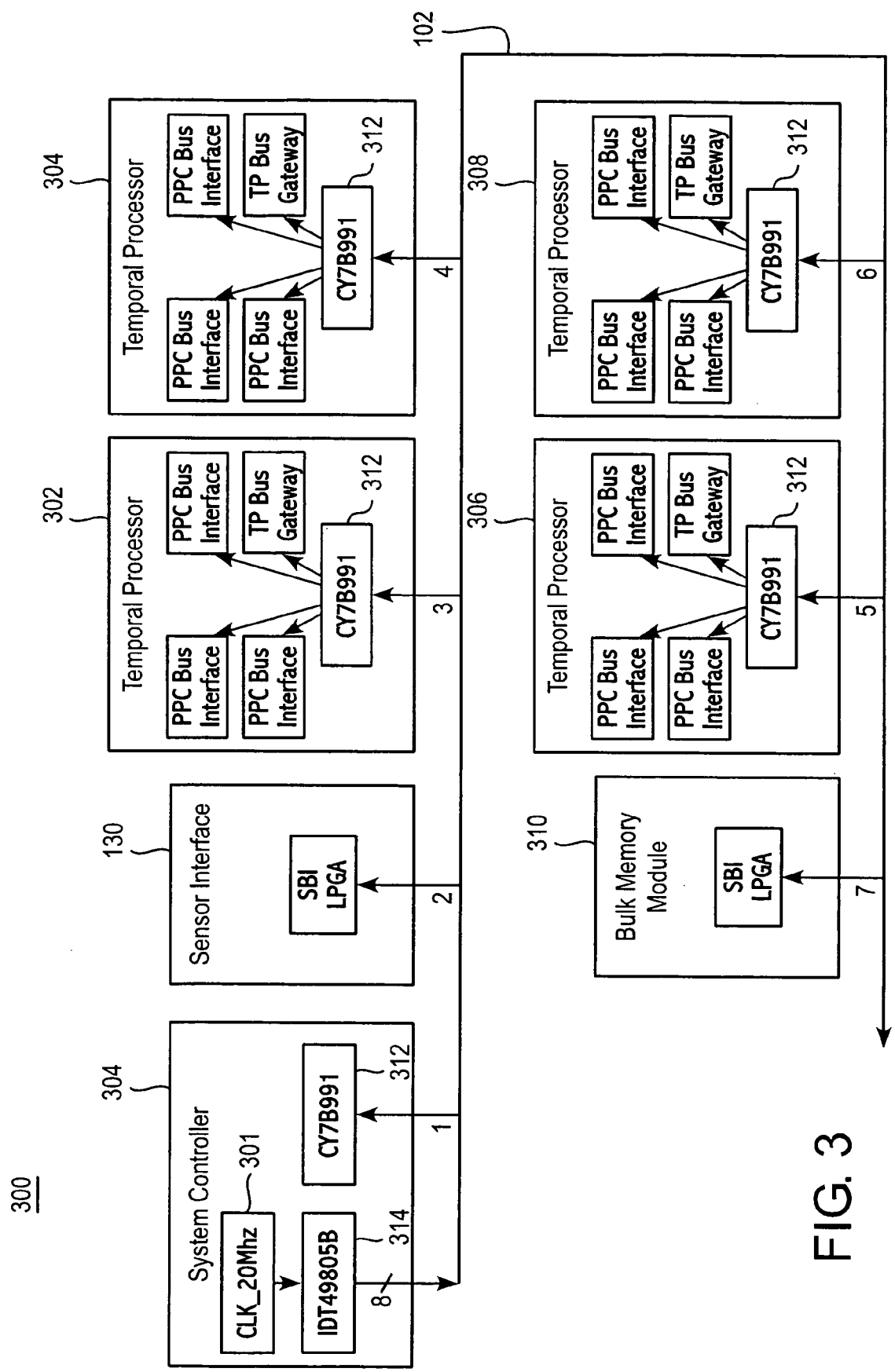
FIG. 3 is a block diagram illustrating an exemplary clock distribution on a system bus configuration.

The block diagram of the system 300 in FIG. 3 illustrates the clock distribution of a system, such as the system 100 shown in FIG. 1. In FIG. 3, timing information is generated by the system clock 301 and transmitted to a sensor interface 130, temporal processor modules 302, 304, 306, 308, and a bulk memory module 310. The bulk memory module 310 is a passive memory module with no processors, which may be optionally included in the system of the present invention. Within each of the temporal processors 302, 304, 306, 308, and the system controller 104, is a zero-skew phase-locked-loop (PLL) element and several nodes including processors.

In accordance with one embodiment of the present invention, the components within each TP module are designed to run synchronously at 20 MHZ. This is accomplished as the PLL element 312 within each TP module is designed to generate outputs that are precisely synchronized to the clock signal transmissions from the transmission component 314, thereby providing system synchrony between all devices on all bus levels. Those skilled in the art will appreciate that the two-tiered structure of the system 300 of the present invention shown in FIG. 3 can run at much higher speeds, as processor speed limits, and bus speed limits are overcome due to new technologies, and other scientific advancements. Such speed increases are intended to be encompassed within the present invention, and require no additional experimentation to implement, but are apparent from the present invention. Furthermore, various part identification numbers and designations are given, such as PPC within the temporal processor modules indicating that a power PC processor is being used. It should be noted, however, that any suitable processor could be used within the temporal processors 302, 304, 306, and 308. Likewise, any suitable replacement parts could be interchanged with those shown in the block diagram of the system 300 of FIG. 3, without departing from the spirit of the present invention.

Recommended Operating Conditions

Below in Table 25 are the recommended operating conditions for the TPBI of the present invention.

TABLE 25

| Parameter | Symbol | Min | Norm | Max | Units |
|---|---|---|---|---|---|
| Supply Voltage 1 | Vcc1 | 4.5 | 5.0 | 5.5 | Volt |
| Supply Voltage 2 | Vcc2 | 3.0 | 3.3 | 3.6 | Volt |
| Temperature Range | | −40 | | +85 | Degrees Celcius |

From the foregoing, it can be seen that the present invention provides a two-level, multi-tier system bus. Such a system has many advantages as outlined herein. The preferred embodiment of the present invention is directed toward transceiver interface device used with a system bus for accessing multiple modules each containing individual module buses, which each have multiple branches containing separate nodes with individual processors. Advantageously, by using the transceiver of the present invention, a system bus may access multiple, interconnected processors without long delays due to bus information traffic. It is anticipated, that the processor speeds and types available, along with bus speeds and types will improve due to engineering and scientific advancements, such as material advancements, for example. The present invention may be utilized by incorporating different data packet sizes and such advancements as advancements in processor speeds and bus traffic speeds, and is fully intended to embrace such advancements. Furthermore, any descriptions of specific devices are intended as exemplary. For example, the TPBI of the present invention was described in an exemplary embodiment as being a 304 pin ceramic quad flat pack (QFP); however, skilled artisans will recognize that other packages could be incorporated within the bounds of the present invention. For example, a QFP having 240 pins, or some other number of pins, could be used with similar efficacy as the 304 pin package described above.

It will be appreciated by those skilled in the art that the present invention can be embodied in other specific forms without departing from the spirit or essential characteristics thereof. The presently disclosed embodiments are, therefore, considered in all respects to be illustrative and not restricted. The scope of the invention is indicated by the appended claims rather than the foregoing description and all changes that come within the meaning and range of equivalents thereof are intended to be embraced therein.

What is claimed is:

1. A transceiver for use within a multi-tier system bus configuration comprising:

means for independently receiving instructions via a system bus from one or more devices connected to the system bus;

means for independently transmitting instructions via the system bus to one or more devices connected to the system bus;

means for buffering instructions received via the system bus to provide a separate receive buffering of control actions from direct memory access (DMA) operations for forward to a local processor bus; and means for buffering instructions transmitted via the local processor bus to provide a separate transmit buffering of control actions from DMA operations to be transmitted to the system bus;

wherein said means for independently receiving instructions is configured to discriminate between different types of input;

wherein said means for independently transmitting instructions is configured to interleave said instructions; and wherein access to the multi-tier system bus is arbitrated such that the control actions preempt the DMA operations.

2. The transceiver of claim 1, wherein said means for independently transmitting instructions is configured to interleave the instructions based upon instruction type.

3. The transceiver of claim 2, wherein said instructions are contained within packets and said means for independently transmitting instructions is configured to interleave the instructions based upon packet type.

4. The transceiver of claim 3, wherein said packets comprise direct memory access (DMA) and control action (CA) packet types.

5. The transceiver of claim 1, wherein said means for independently receiving instructions is configured to discriminate between different types of input based upon received instruction type.

6. The transceiver of claim 5, wherein said input is contained within packets and said means for independently receiving instructions is configured to discriminate between the different types of input based upon packet type.

7. The transceiver of claim 6, wherein said packets comprise direct memory access (DMA) packets and Control Action (CA) packet types.

8. The transceiver of claim 1, wherein said means for independently receiving instructions is configured to provide specialized control functions.

9. The transceiver of claim 8, wherein said specialized control functions include: a reset function, a timer function, and a broadcast function.

* * * * *